(12) United States Patent
Duncombe et al.

(10) Patent No.: US 12,513,369 B1
(45) Date of Patent: Dec. 30, 2025

(54) TIME DOMAIN VIDEO EXTENSION

(71) Applicant: Adobe Inc., San Jose, CA (US)

(72) Inventors: Gabriela Duncombe, Houston, TX (US); Xue Bai, Bellevue, WA (US); Lakshya Lnu, San Jose, CA (US); Kshitiz Garg, Santa Clara, CA (US); Gunjan Aggarwal, Sunnyvale, CA (US); Feng Liu, Beaverton, OR (US); Aseem Agarwala, Seattle, WA (US); Ali Aminian, Piedmont, CA (US); Jui-Hsien Wang, Sammamish, WA (US); Zhe Wang, Sunnyvale, CA (US)

(73) Assignee: Adobe Inc., San Jose, CA (US)

(*) Notice: Subject to any disclaimer, the term of this patent is extended or adjusted under 35 U.S.C. 154(b) by 0 days.

(21) Appl. No.: 18/830,356

(22) Filed: Sep. 10, 2024

(51) Int. Cl.
| | |
|---|---|
| *H04N 21/81* | (2011.01) |
| *G06T 5/77* | (2024.01) |
| *G06T 7/20* | (2017.01) |
| *H04N 21/431* | (2011.01) |
| *H04N 21/44* | (2011.01) |

(52) U.S. Cl.
CPC ............ *H04N 21/816* (2013.01); *G06T 5/77* (2024.01); *G06T 7/20* (2013.01); *H04N 21/4312* (2013.01); *H04N 21/44016* (2013.01)

(58) Field of Classification Search
CPC ............ H04N 21/816; H04N 21/4312; H04N 21/44016; G06T 5/77; G06T 7/20
See application file for complete search history.

(56) References Cited

PUBLICATIONS

"Luma Dream Machine", New Freedom, 2024, 23 pages.
Descript, "AI video editing that's less work, more flow, Free Online Video Editor 2024", 2024, 14 pages.
Pika, "Introducing Pika 1.5", 2024, 7 pages.
Runway, "Tools for human imagination, Advancing creativity with artificial intelligence.", Sep. 18, 2024, 13 Pages.
Sora, "OpenAI", 2024, 12 pages.

*Primary Examiner* — Anthony Bantamoi
(74) *Attorney, Agent, or Firm* — Nicholson De Vos Webster & Elliott LLP

(57) ABSTRACT

Embodiments are disclosed for generating a temporally coherent video extension. The method includes displaying, on a graphical user interface, a user interface element representing a video to be extended, where the video includes a number of frames. The method further includes receiving an input via the graphical user interface associated with the user interface element. The input causes a visual change to the user interface element which represents a duration of an extension to be made to the video. The method further includes generating frames based on the duration of the extension. The generated frames use motion information determined from frames of the video. The motion information represents a per-pixel motion between at least a pair of frames of the video. The method further includes providing, for display on the graphical user interface, an extended video including the frames of the video and the generated frames.

20 Claims, 11 Drawing Sheets

TIME DOMAIN VIDEO EXTENSION

BACKGROUND

The ability to easily capture videos has resulted in an explosive growth of storing videos. Various tools exist to edit the content of stored videos. The content of the video can limit the available edits that can be performed on the video. For example, transitions can be added to the beginning of a video or an ending of a video to stitch video content together. Transitions are used to couple a first video and a second video by progressively modifying content of the first video until content of a second video is visible to a user.

SUMMARY

Introduced here are techniques/technologies that generate temporally coherent video content. The video generation system of the present disclosure is able to generate video extension frames that increase the duration of the video. The generated frames include content that is visually and semantically consistent with the content of the video being extended and can be added to the video being extended (e.g., the beginning or end of the video). In addition to adding content in the time domain to increase the duration of the video being extended, the video generation system utilizes a user interface that allows a user to specify the duration of the generated video extension frames. The user interface is used to display the generated video extension frames to the user using a seamless integration of the generated video extension frames with the video being extended. The video generation system can also perform a variety of related tasks (e.g., text to video generation, image to video generation, inpainting, outpainting, motion brush, and video extension) using multi-task learning.

More specifically, in one or more embodiments, a text-to-video generative model includes temporal layers that capture information across multiple frames of a video to be extended. The information across multiple frames can include motion information (e.g., information associated with moving objects across frames). As a result, the generated video extension frames are temporally coherent, matching the existing video with respect to object motion. The temporal layers of the text-to-video generative model are trained using supervised learning and training data frames that are curated to include semantically similar subject matter.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

One or more embodiments of the present disclosure include a video generation system that creates temporally coherent video content to extend the duration of the video in the time domain. In one conventional approach, frames of a video are duplicated to extend the duration of the video. However, such conventional approaches result in jarring and unpolished transitions that appear visually inconsistent. Another conventional approach generates video content using machine learning models such as text-to-image generative models. However, such conventional approaches use a single frame to generate video content. Accordingly, the generated video content lacks motion information (e.g., object velocity and acceleration). Because such approaches do not capture motion information across multiple frames, by virtue of the text-to-image generative model receiving a single input frame, the generated content can appear visually inconsistent with respect to the video. Additionally, such conventional systems using text-to-image generative models can create video frames with content that does not match, or is not consistent with, the content of the video to be extended. For example, the text-to-image generative model can create a new frame with a new object.

To address these and other deficiencies in conventional systems, the video generation system of the present disclosure generates video content using a text-to-video machine learning model configured to obtain multiple frames of a video to be extended. The generated video content is coherent in terms of content (e.g., no surprising or abrupt objects are added) and time (e.g., the generated content appears visually consistent with respect to objects in the original input video).

Improving the visual aesthetics of generated content reduces computing resources that would otherwise be consumed re-running conventional video generation systems that generate choppy or visually inconsistent video extension frames. By deploying the video generation system described herein to generate video frames to be used as an extension of an original video, software resources are not consumed fixing or otherwise adjusting low-quality or otherwise inaccurate video frames. The video generation system of the present disclosure generates video content less often, as a result of more accurate generated video frames, conserving power, bandwidth, memory, and other computing resources.

Figure 1:
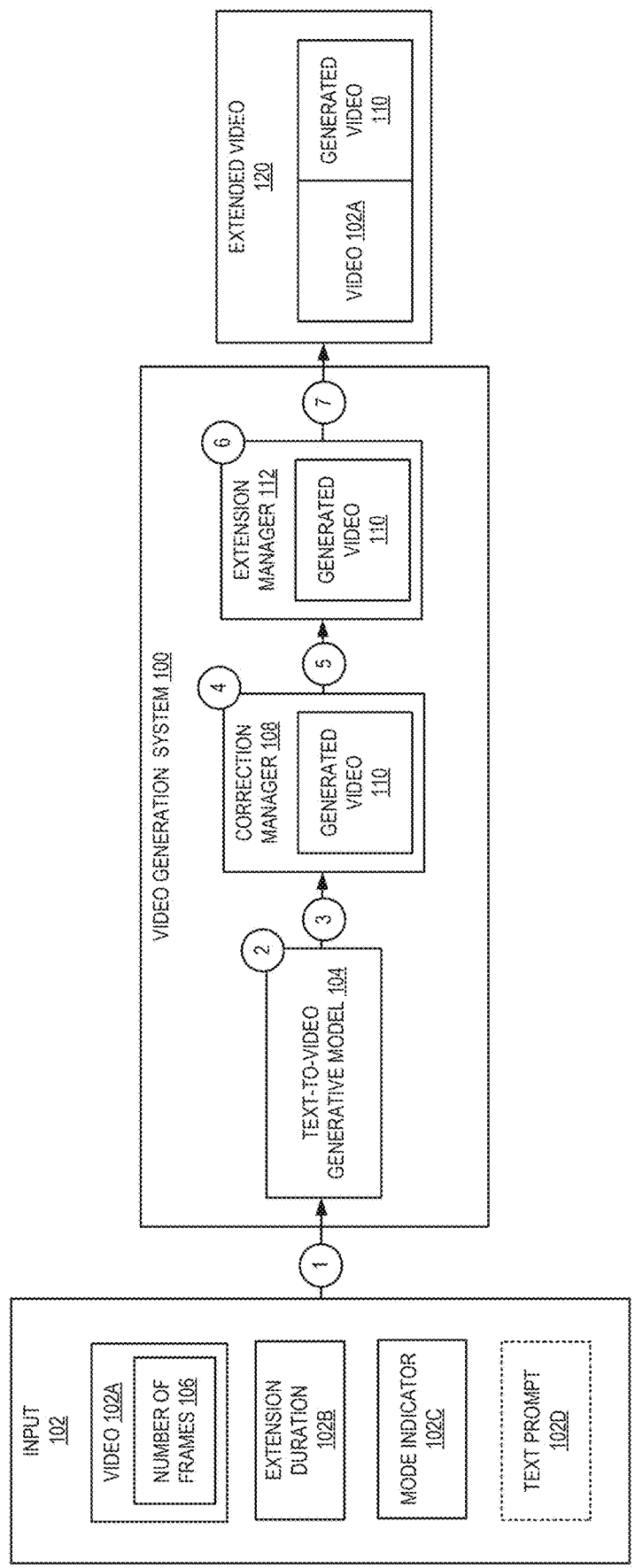
FIG. 1 illustrates a diagram of a process of generating a temporally coherent video extension, in accordance with one or more embodiments.

FIG. 1 illustrates a diagram of a process of generating a temporally coherent video extension, in accordance with one or more embodiments. As shown in FIG. 1, a video generation system 100 can generate video extension frames, extending the duration of a video in the time domain. The generated video extension frames are consistent with respect to the content of the video being extended, and also visually match the content of the video being extended (e.g., the content of the generated video extension frames does not appear visually choppy). The video generation system 100 may be implemented as a standalone system, such as an application executing on a client computing device, server computing device, or other computing device. In some embodiments, the video generation system 100 may be implemented as a tool incorporated into another system, service, application, etc. to generate frames in the time dimension. The video generation system 100 may be implemented in a user device, in a service provider device as part of a cloud computing model, or other device which may receive text and return output videos.

At numeral 1, the video generation system 100 receives input 102. The input 102 includes a number of frames 106 of a video 102A. In some embodiments, the number of frames 106 is a subset of frames making up the video 102A. A video (e.g., video 102A) is a sequence of frames that, when presented to a user, visually cause objects in the frames to appear in motion. In some embodiments, the number of frames 106 includes frames at the start of the video 102A. Accordingly, the generated video 110 will extend the video 102A in the temporal dimension from the beginning of the video 102A to obtain extended video 120. In some embodiments, the number of frames 106 include frames at the end of the video 102A. Accordingly, the generated video 110 will extend the video 102A in the temporal dimensions at the end of the video 102A to obtain extended video 120. In some embodiments, the frames included in the number of frames 106 can be other frames of video 102A (e.g., frames in the middle of the video 102A).

In some embodiments, the video 102A includes the extended video 120. For example, a user may use the video generation system 100 during a first iteration to extend the duration of the video 102A, resulting in the extended video 120. Subsequently, the user uses the video generation system 100 at a second iteration to further extend the duration of the extended video 120 in the time domain. That is, the number of frames 106 can include frames of the generated video 110.

The input 102 also includes an extension duration 102B. The extension duration 102B indicates a user-determined duration of the generated video 110. The extension duration 102B is described in more detail in FIG. 8. As described herein, in some embodiments the extension duration 102B is a timeline driven numerical input. That is, a slider (or some other user interface mechanism) is manipulated by a user to indicate the extension duration 102B. The extension duration 102B can be converted from a user interface input to a number of seconds of generated video 110.

In some embodiments (not shown), the video generation system 100 also receives a video resolution (e.g., a frame rate) as part of input 102 at numeral 1. Higher resolutions (e.g., higher frame rates) correspond to higher frames per second, indicating the text-to-video generative model 104 is to generate a higher number of frames of the generated video 110. In some embodiments, a user indicates the video resolution. In other embodiments, one or more upstream applications determine the video resolution of video 102A and pass the video resolution of video 102A to the video generation system 100. In other embodiments, the video generation system 100 determines the video resolution using the video 102A. Using both the extension duration 102B (a number of seconds of the generated video 120) and the video resolution (a frame rate of the generated video 120), the video generation system 100 is able to determine a number of frames to generate of the generated video 110 such that the generated video 110 is a duration equal to that of the extension duration 102B.

The input 102 can also include a mode indicator 102C. As described herein, the text-to-video generative model 104 is trained to perform multiple tasks using multi-task learning. The mode indicator 102C can indicate a mode of the text-to-video generative model 104 selected by a user. For example, one hot encoding can be used to indicate the mode of the text-to-video generative model 104.

A mode of the text-to-video generative model 104 can include text-to-video generation, where the text-to-video generative model 104 is used to generate temporally coherent video frames using text prompt 102D. In this mode, the video 102A may not be received as part of input 102, and instead the text prompt 102D is received as part of input 102 to create video content generated by the text-to-video generative model 104.

Another mode of the text-to-video generative model 104 can include image-to-video generation, where the text-to-video generative model 104 is used to generate temporally coherent video frames using an image. In this mode, in some embodiments, instead of receiving video 102A as part of input 102, an image is received as input 102. In other embodiments, the number of frames 106 of the video 102A is one.

Another mode of the text-to-video generative model 104 is inpainting, where the text-to-video generative model 104 is used to generate internal content of an image or a video. In this mode, instead of, or in addition to, generating content in the time domain, content is generated in the spatial domain. For example, pixels of an input video 102A (or an image) are generated within the bounds of the input video 102A (or image). In this manner, holes or gaps in an image or video can be filled in, for instance, using generated content in the spatial domain. In this mode, the input 102 can include a region of the image or video to be spatially completed.

Another mode of the text-to-video generative model 104 is outpainting, where the text-to-video generative model 104 is used to generate external content of an image or a video. Similar to inpainting, in this mode, the text-to-video generative model 104 generates content in the spatial domain. However, the generated content in the spatial domain is external to the content of the image or video. In other words, the text-to-video generative model 104 uses outpainting to change the dimensions of the image or video. For example, an image that is 256×256 pixels can be transformed into an image that is 512×512 pixels using outpainting. In this mode, the input 102 can include a target dimension of the image or video.

Another mode of the text-to-video generative model 104 is motion brush, where the text-to-video generative model 104 is used to animate one or more objects of an image. For example, the extended video 120 becomes an animated image, and the generated video 110 includes frames that animate one or more objects of the image over time such that the objects that are animated in the frames appear as visually moving with respect to the rest of the objects in the image.

In this mode, the input 102 can include a region of the image (or one or more objects of the image) to be animated.

Another mode of the text-to-video generative model 104 is video extension, where the text-to-video generative model 104 is used to extend the video 102A in the time domain. The generated video 110 is temporally coherent and predictable with respect to the video 102A. That is, the generated video 110 does not include new or surprising objects as part of the content of the generated video 110. For ease of description, the video extension mode is described. However, the text-to-video generative model 104 is configured to generate other outputs associated with other modes.

In some embodiments (e.g., depending on the mode selected by the user), the text-to-video generative model 104 receives text prompt 102D. That is, text prompt 102D is optionally received by the text-to-video generative model 104 as part of input 102. Text prompt 102D is a natural language description of content to be generated. Text prompt 102D can include sentences, phrases, keywords, acronyms and the like.

At numeral 2, the text-to-video generative model 104 receives the input 102 and generates video 110. As described herein, the generated video 110 includes a number of frames based on the extension duration 102B that extends the video 102A in the time dimension. In operation, the text-to-video generative model 104 determines motion information from frames (e.g., the number of frames 106) received by the text-to-video generative model 104 to generate the temporally coherent frames of the generated video 110. The frames of the generated video 110 (e.g., the generated video extension frames) are temporally coherent because they are generated in such a way that causes the content depicted in the frames to appear visually consistent with the content of the video being extended (e.g., video 102A). That is, the generated extension frames include content that is not choppy with respect to the content of the video being extended. The frames are also coherent because they do not include subject matter that is new or surprising with respect to the content of the video being extended. In some embodiments, the text-to-video generative model 104 is a text-to-image generative model or other machine learning model that has been modified to generate content across frames of the time domain.

A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

At numeral 3, generated video extension frames (e.g., generated video 110) are passed to the correction manager 108. At numeral 4, the correction manager 108 calibrates the generated video 110 frames with one or more video 102A frames (e.g., frames of the number of frames 106 of the video 102A). In some embodiments, the correction manager 108 calibrates the brightness and contrast of the generated video 110 with the brightness and contrast of the video 102A. In some embodiments, one or more other image statistics of the generated video 110 frames (e.g., saturation, hue, color, etc.) are calibrated using image statistics of frames of the video 102A.

In operation, the correction manager 108 extracts image statistics of the frames of the video 102A to be calibrated. For example, the correction manager 108 extracts brightness features and contrast features using the number of frames 106 of the video 102A. For example, the correction manager 108 measures an intensity value (e.g., brightness) of pixels in the frames of the number of frames 106. The intensity values of the pixels, determined by the correction manager 108, become the brightness features for a frame in the number of frames 106. In some embodiments, the correction manager 108 uses a histogram to extract features from a frame in the number of frames 106. For example, a histogram can indicate a frequency of a distribution. In some embodiments, the correction manager 108 uses a histogram indicating a frequency of pixel intensity values to determine brightness features for a frame of the number of frames 106. In some embodiments, the correction manager 108 extracts image features using any one or more feature extractors. In some embodiments, the correction manager 108 uses a set of features to determine another set of features. For example, the correction manager 108 uses the brightness features extracted from a frame of the number of frames 106 to determine contrast features for the frame of the number of frames 106. The correction manager 108 can determine the contrast features for the frame by taking the difference between the intensity value of pixels in the frame (e.g., the brightness features) and color values of pixels in the frame.

The correction manager 108 then applies the extracted features (e.g., brightness features and contrast features, for example) to the frames of the generated video 110. For example, the correction manager 108 can apply the intensity value for each pixel in a frame of the number of frames 106 to corresponding pixels in a frame of the generated video 110. As a result, the brightness of frames in the generated video 110 matches the brightness of frames in the video 102A.

In some embodiments, the correction manager 108 processes the extracted features from one or more frames of the video 102A (e.g., frames of the number of frames 106). For example, the correction manager 108 can average the brightness features across the frames of the number of frames 106 and apply the averaged brightness features to each of the frames of the generated video 110. In some embodiments, the correction manager 108 uses any histogram-based approach to apply features extracted from frames of the number of frames 106 to frames of the generated video 110. The generated video 110 is considered to include calibrated features as a result of the correction manager 108 application of the extracted features to the features of the generated video 110.

In some embodiments, the correction manager 108 modulates the calibrated features of the generated video 110 using one or more continuous ramping functions. For example, the correction manager 108 applies a smooth step function to the brightness features of the frames of the generated video 110. By applying the smooth step function to features of the frames of the generated video 110 (e.g., brightness features and contrast features, for instance), the correction manager 108 encourages visual stability. For example, if an object in the generated video 110 leaves the video gradually over a number of frames of the generated video 110, visual aspects of the generated video 110 will change (e.g., the frames can appear visually darker or lighter as the object leaves the frames of the generated video). The ramping function applied by the correction manager 108 to the calibrated features of the generated video 110 mitigates the gradual visual changes.

At numeral 5, the corrected generated video (including the calibrated features determined by the correction manager 108), illustrated in FIG. 1 as generated video 110 for ease of description, is passed to the extension manager 112. At numeral 6, the extension manager 112 combines the generated video 110 with the input video 102A based on e.g., the mode indicator 102C or other information which indicates how the generated video is to be added to the input video. For example, the extension manager 112 can increase the duration of video 102A in the time domain by adding the generated video 110 to the beginning of the video 102A, the end of video 102A, or some other location of video 102A. In operation, the extension manager 112 combines the generated video 110 with the video 102A to obtain the extended video 120. For example, the extension manager 112 can concatenate the frames of the generated video 110 (e.g., video extension frames) with the frames of the video 102A (and specifically, the frames included in the number of frames 106) to obtain the extended video 120.

If, instead of the corrected generated video, the extension manager 112 received the generated video from the text-to-video generative model 104, then the combination of the generated video 110 with the video 102A could cause visual artifacts such as flickering. For example, if the extension manager 112 combined the video 102A with generated video frames from the text-to-video generative model 104, then the extended video 120 may appear visually darker or lighter when the video 102A frames transition to and/or from the generated video 110 frames.

At numeral 7, the video generation system 100 outputs the extended video 120, which is a combination of the video 102A and the generated video 110. The extended video 120 can be provided to a user via a graphical user interface. The extended video 120 includes frames of the video 102A that that are nested within the generated video 110 (e.g., the corrected generated video extension frames) as a result of the operations of the correction manger 108 and the extension manager 112 performed at numerals 4 and 6 respectively. That is, the frames of the generated video 110 and the video 102A are in sequence. The extended video 120 appears, to the user using the graphical user interface, as a single seamless video 102A including the generated video 110.

Figure 2:
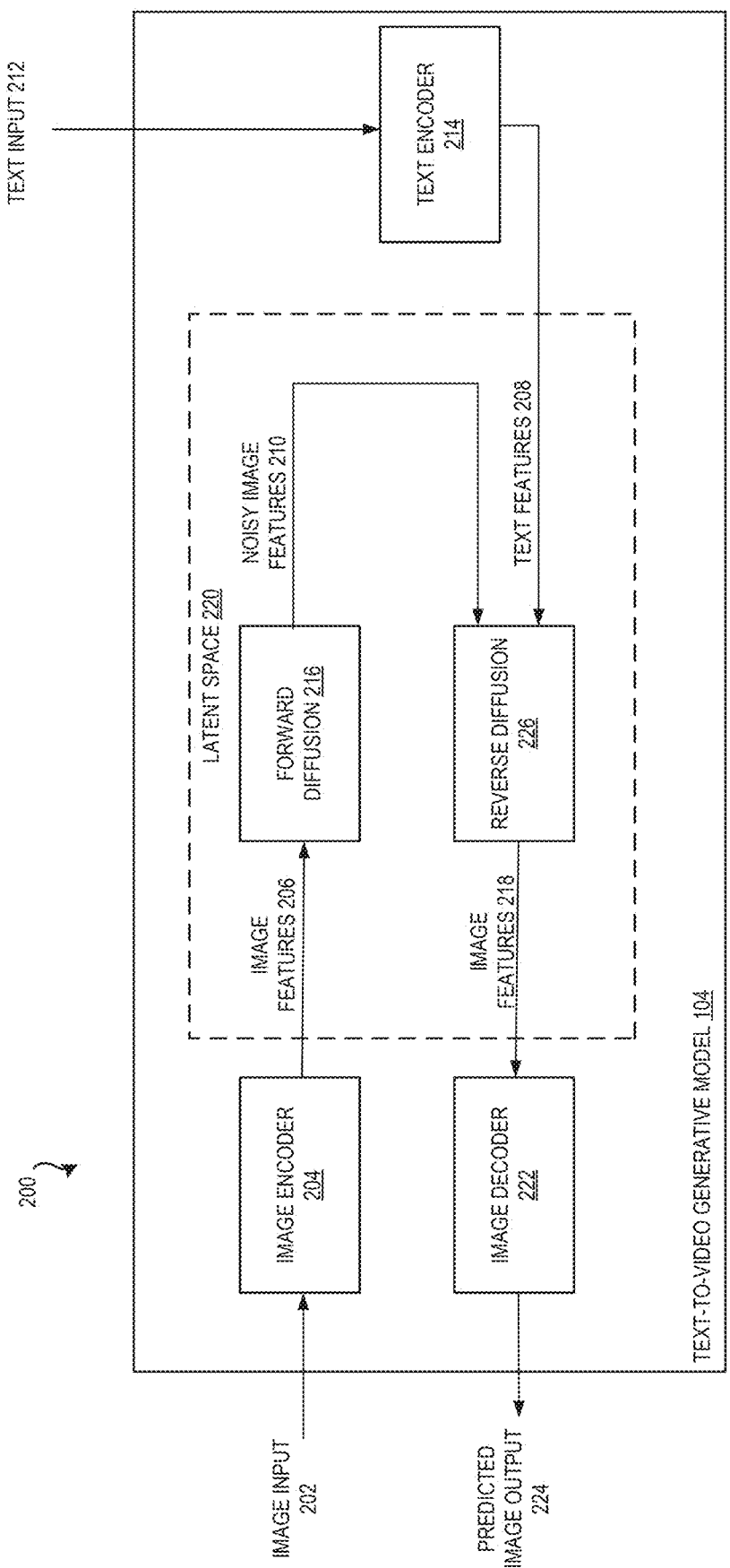
FIG. 2 illustrates an example portion of the text-to-video generative model and stable diffusion, in accordance with one or more embodiments.

FIG. 2 illustrates an example portion of the text-to-video generative model and stable diffusion, in accordance with one or more embodiments. As described herein, any generative model (such as a diffusion model) can be executed to generate an image related to text using the text-to-video generative model 104.

As described herein, the text-to-video generative model 104 is a modified text-to-image generative model that has been adapted to generate video using temporal information. That is, the text-to-video generative model 104 generates a sequence of frames across time (e.g., generated video 120). The text-to-image generative model uses diffusion such as that described example 200 to generate a sequence of temporally coherent images (e.g., frames). In operation, one or more temporal layers (not shown in FIG. 2) are added to a text-to-image generative model to obtain the text-to-video generative model 104. The temporal layers can include temporal attention layers that attend a frame in the time domain without modifying spatial information. The temporal layers can also include temporal convolutional layers. Training the temporal layers of the text-to-video generative model is described in FIG. 6 and FIG. 7. In operation, during a training period, the spatial layers of the text-to-video generative model 104 (e.g., the layers of the text-to-image generative model) are frozen to preserve creativeness and image quality of the generated images. The temporal layers of the text-to-video generative model 104 are updated during the training period to learn motion, objects, shapes, etc. The text-to-image generative model with temporal layers that are trained using temporal information is the text-to-video generative model 104.

As shown in example 200, generative machine learning involves predicting features for a given label. For example, given a label (or natural prompt description) "cat", a text-to-image generative model determines the most likely features associated with a "cat." The features associated with a label are determined during training using a reverse diffusion process in which a noisy image is iteratively denoised to obtain an image. In operation, a function is determined that predicts the noise of latent space features associated with a label.

During a training period, an image (e.g., an image of a cat) and a corresponding label (e.g., "cat") are used to teach the text-to-video generative model 104 features of a prompt (e.g., the label "cat"). As shown in FIG. 2, an input image 202 (e.g., a frame of video 102A described in FIG. 1) and a text input 212 (e.g., the text prompt 102D described in FIG. 1) are transformed into latent space 220 using an image encoder 204 and a text encoder 214 respectively. The latent space 220 is a space in which unobserved features are determined such that relationships and other dependencies of such features can be learned. Specifically, latent space is an abstract multi-dimensional space in which data can be compared. Data with similar meanings, features, or characteristics is positioned closer together in latent space than data with dissimilar meanings, features, or characteristics. After the text encoder 214 and image encoder 204 have encoded text input 212 and image input 202 respectively, image features 206 and text features 208 are determined from the image input 202 and text input 212 accordingly. In some embodiments, the image encoder 204 and/or text encoder 214 are pretrained. In other embodiments, the image encoder 204 and/or text encoder 214 are trained jointly.

Once image features 206 have been determined by the image encoder 204, a forward diffusion process 216 is performed according to a fixed Markov chain to inject gaussian noise into the image features 206. The forward diffusion process 216 is described in more detail in FIG. 3. As a result of the forward diffusion process 216, a set of noisy image features 210 are obtained.

The text features 208 and noisy image features 210 are algorithmically combined in one or more steps (e.g., iterations) of the reverse diffusion process 226. The reverse diffusion process 226 is described in more detail in FIG. 3. As a result of performing reverse diffusion, image features 218 are determined, where such image features 218 are similar to image features 206. The image features 218 are decoded using image decoder 222 to predict image output 224. Similarity between image features 206 and 218 may be determined in any way. In some embodiments, instead of comparing similarity between image features, the similarity between images (e.g., image input 202 and predicted image output 224) is determined in any way. The similarity between image features 206 and 218 and/or images 202 and 224 can be used to adjust one or more parameters of the reverse diffusion process 226.

Figure 3:
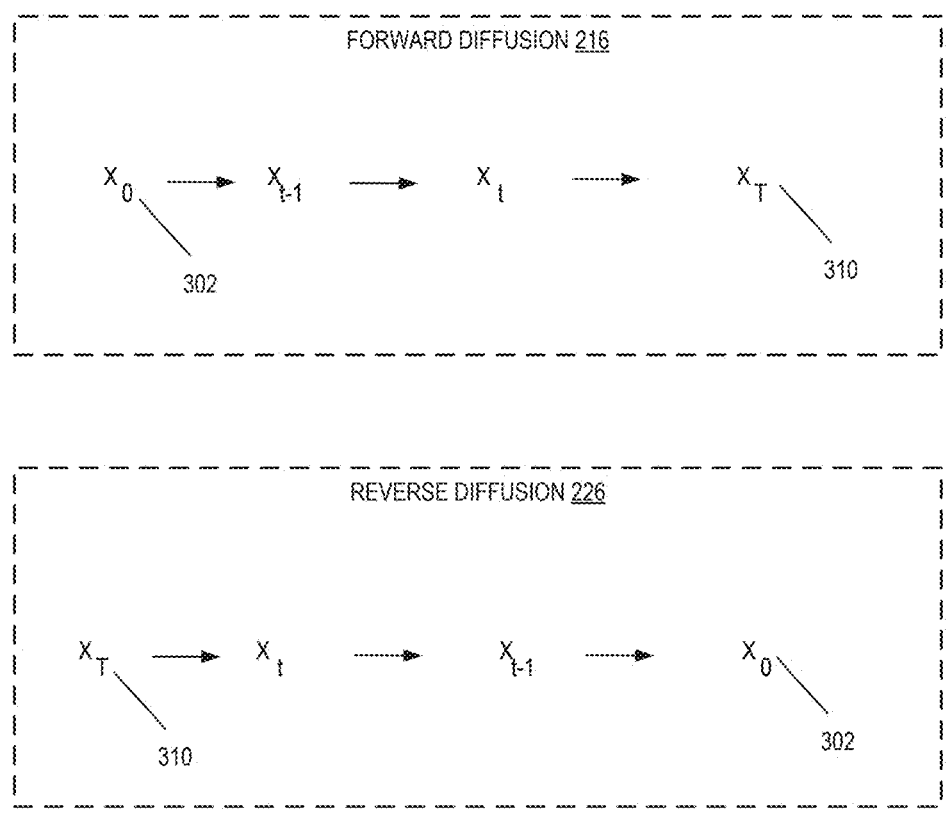
FIG. 3 illustrates a diffusion process used to train the text-to-video generative model, in accordance with one or more embodiments.

FIG. 3 illustrates a diffusion process used to train the text-to-video generative model, in accordance with one or more embodiments. The text-to-video generative model 104 may be implemented using any generative machine learning model architecture in which the input dimensionality and the output dimensionality are the same. For example, the text-to-video generative model 104 may be implemented using a UNet neural network architecture.

As described herein, a forward diffusion process adds noise over a series of steps (iterations t) according to a fixed Markov chain of diffusion. Subsequently, the reverse diffusion process removes noise to learn a reverse diffusion process to construct a desired image (based on the text input) from the noise.

The forward diffusion process 216 starts at an input (e.g., feature $X_0$ indicated by 302). Each time step t (or iteration) up to a number of T iterations, noise is added to the feature X such that feature $X_T$ indicated by 310 is determined. As described herein, the features that are injected with noise are latent space features. If the noise injected at each step size is small, then the denoising performed during reverse diffusion process 226 may be accurate. The noise added to the feature X can be described as a Markov chain where the distribution of noise injected at each time step depends on the previous time step. That is, the forward diffusion process 216 can be represented mathematically $q(X_{1:T}|X_0)=\Pi_{t=1}^{T}=q(X_t|X_{t-1})$.

The reverse diffusion process 226 starts at a noisy input (e.g., noisy feature $X_T$ indicated by 310). Each time step t, noise is removed from the features. The noise removed from the features can be described as a Markov chain where the noise removed at each time step is a product of noise removed between features at two iterations and a normal Gaussian noise distribution. That is, the reverse diffusion process 326 can be represented mathematically as a joint probability of a sequence of samples in the Markov chain, where the marginal probability is multiplied by the product of conditional probabilities of the noise added at each iteration in the Markov chain. In other words, the reverse diffusion process 226 is $p_\theta(X_{0:T})=p(X_t)\Pi_{t=1}^{T}p_\theta(X_{t-1}|X_t)$, where $p(X_t)=N(X_t; 0,1)$.

During deployment of the diffusion model, the reverse diffusion process is used in the text-to-video generative model to generate images based on an input text using noise. That is, a latent space noise representation is progressively denoised using the reverse diffusion process 226 to obtain an intermediate representation of the target image to be generated. Subsequently, images are generated from the intermediate representation using a decoder.

Figure 4:
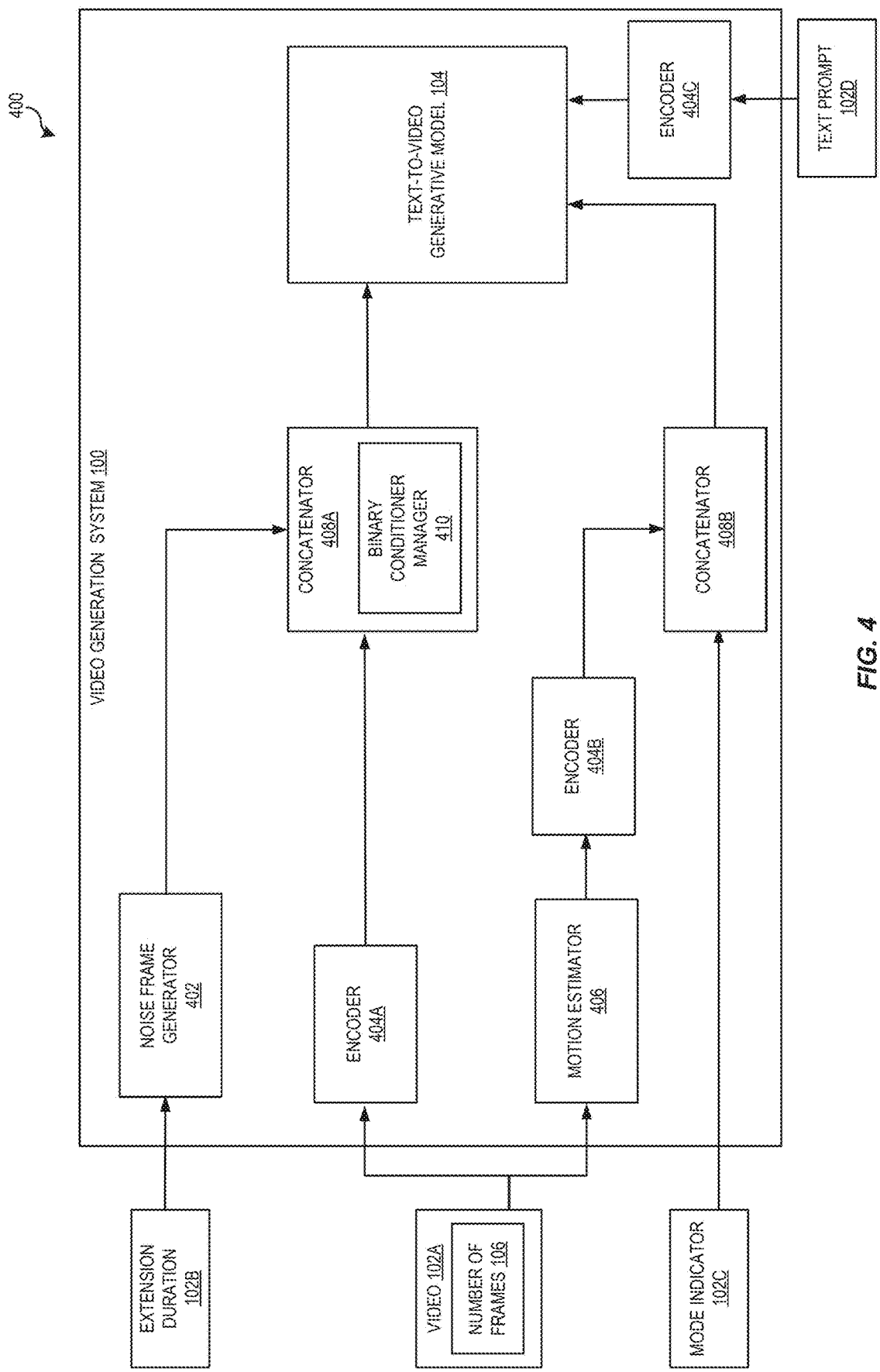
FIG. 4 illustrates an example portion of the text-to-video generative model, in accordance with one or more embodiments.

FIG. 4 illustrates an example portion of the text-to-video generative model, in accordance with one or more embodiments. As described herein, the extension duration 102B corresponds to a number of extension frames to be generated. In some embodiments, the extension duration 102B (a unit of time) and a resolution (a video quality indicator such as frame rate) are used to determine the number of extension frames to be generated. For example, multiplying the extension duration 102B and the frame rate results in a number of extension frames to be generated.

The noise frame generator 402 generates a number of noise frames equal to the number of extension frames to be generated. As described herein, the text-to-video generative model 104 generates a temporal sequence of images (e.g., generated video extension frames) by denoising noise frames. The noise frame generator 402 generates the number of noise frames that are denoised to produce generated content of the generated video extension frames (e.g., generated video 110 described in FIG. 1). Noise frames generated by the noise frame generator 402 are passed to concatenator 408A.

The frames of the video 102A (e.g., a number of frames 106 of the video 102A) are passed to encoder 404A and motion estimator 406. As described herein, the encoder 404A encodes each frame of the video 102A into a latent space image representation (e.g., an image embedding corresponding to each frame of the number of frames 106 of the video 102A). The number of frames 106 received by the video generation system 100 can be a number of frames at the beginning of the video 102A (e.g., frame 0 to frame n, where frame 0 is the first frame of the video 102A). The number of frames 106 received by the video generation system 100 can also be a number of frames at the end of the video 102A (e.g., frame n to frame z, where z is the last frame of the video 102A). In some embodiments the number of frames 106 are three such that three frames of the video 102A are passed to the encoder 404A and the motion estimator 406.

In some embodiments, encoder 404A is the same as encoder 404C and/or encoder 404B. In some embodiments, the operations of the encoder 404A are the same or similar to the operations of encoder 404C and/or encoder 404B. The encoders are referred to herein collectively as encoder 404. Encoders 404 include one or more convolutional layers and pooling layers which downsample the input to the respective encoder. The result of each encoder 404 is an encoded representation (e.g., an embedding) of the input to the encoder, which is a latent space representation of the input to the encoder. Accordingly, the output of encoder 404A is a latent space image representation (e.g., an image embedding corresponding to each frame of the number of frames 106), the output of encoder 404B is a latent space motion representation (e.g., motion embeddings), and the output of encoder 404C is a latent space text representation (e.g., text embeddings).

In some embodiments, concatenator 408A is the same as concatenator 408B. In some embodiments, the operations of the concatenator 408A are the same or similar to the operations of the concatenator 408B. The concatenators are referred to herein collectively as concatenator 408. Concatenators 408 algorithmically combine one or more inputs into an input representation for the text-to-video generative model 104. For example, the representation input to the text-to-video generative model 104 is a vector representation. The concatenator 408A combines a number of noise frames generated by the noise frame generator 402 with the image embeddings of the frames of the video 102A to generate a vector or other input representation. Similarly, concatenator 408B combines a mode indicator 102C with the motion embeddings generated by the motion estimator 406 and encoder 404B to generate a vector or other input representation. In some embodiments, the concatenators 408 pad their respective inputs during the concatenation. For example, concatenator 408A can pad the image embeddings obtained from the number of frames 106 of the video 102A before concatenating the image embeddings with the noise frames received from the noise frame generator 402.

As shown in example 400, when concatenator 408A combines the noise frames with the image embeddings, the concatenator 408 applies a binary mask to distinguish the combined noise frames with the combined image embeddings using the binary conditioner manager 410. In this manner, the vector representation generated by the concatenator 408 distinguishes the noise frames from image embeddings using a binary mask applied to the vector representation. For example, the binary conditioner manager 410 creates a binary mask the dimension of the noise frames (generated by the noise frame generator 402) and/or the dimension of frames of the video 102A. In some embodiments, the binary conditioner manager 410 sets the values of pixels of the binary mask to a value (e.g., a value of "1") for a number of masks corresponding to the number of frames 106 and the values of pixels of the binary mask to a different value (e.g., a value of "0") for a number of masks corresponding to the number of noise frames. For example, if the number of frames 106 is set to three (e.g., three frames of the video 102A are passed to the video generation system 100) then the binary conditioner manager 410 sets the values of pixels in three binary masks to one. As a result, the text-to-video generative model 104 freezes content associated with the video (e.g., the content associated with the binary masks with pixels set to "1" for instance) and generates content for a number of binary masks equal to the number of noise frames (e.g., the binary masks with pixels set to "0" for instance).

The motion estimator 406 is used to provide motion information associated with the number of frames 106 of the video 102A to the text-to-video generative model 104. The motion information enables the text-to-video generative model 104 to generate content that appears in motion such that the generated content is visually consistent and coherent with respect to the content of the video 102A. In some embodiments, the motion information includes a velocity, represented as an optical flow across frames of the number of frames 106 received by the motion estimator 406. In other embodiments, the motion information includes an average amount of optical flow.

The motion estimator 406 can use any one or more models to generate a sequence of normal maps using the frames of the video 102A. For example, given a frame of the received frames of the video 102A, a machine learning model, such as a generative adversarial network (GAN) can generate a sequence of normal maps.

A normal map captures information about the surface of an object in a frame of a video. For example, in a RGB image (e.g., a frame of the number of frames 106), each channel (e.g., Red, Green, Blue) can correspond to a dimension X, Y, Z of each surface normal of an object. A sequence of normal maps can capture a warping or movement of the surface of the object. In other words, the sequence of normal maps defines the animation of the object across the frames of the video 102A. The sequence of normal maps includes a normal map for each frame of a video sequence (e.g., the number of frames 106).

The motion estimator 406 can include any one or more models to compute an optical flow using the sequence of normal maps. The optical flow (referred to herein as "flow") represents an estimation of per-pixel motion between a pair of consecutive normal maps in the sequence of normal maps. Specifically, a flow map represents an intensity value of each pixel, where the intensity value of the pixel corresponds to speed of motion of the pixel across a pair of frames. In some embodiments, a machine learning model such as the Recurrent All-Pair Field Transformers (RAFT) is used to determine the optical flow of the sequence of normal maps. In some embodiments, the motion estimator 406 determines the mean of the optical flow in the frames received by the motion estimator 406 (e.g., the number of frames 106). The flow is passed to encoder 404B such that the encoder 404B encodes the flow and passes a latent space motion representation (e.g., motion embeddings) to the concatenator 408B.

As described herein, the text-to-video generative model 104 can be a multitask model configured to perform a variety of tasks. As such, the text-to-video generative model 104 can receive an indication of which task is to be performed using the mode indicator 102C. As described herein, tasks learned by the text-to-video generative model 104 include text-to-video, image-to-video, inpainting, outpainting, motion brush, and video extension, for example.

In some embodiments, depending on the task to be performed, the inputs to the text-to-video generative model 104 change. For example, if the text-to-video generative model 104 is to perform a text-to-video task (as indicated by mode indicator 102C), then any frames of the video 102A are discarded and/or set to zero. Accordingly, because video 102A frames are not processed, binary masks generated by the binary conditioner manager 410 are set to zero.

If the text-to-video generative model 104 is to perform an image-to-video task (as indicated by mode indicator 102C), then the number of frames 106 of the video 102A is one and/or any additional frames other than a single frame received by the video generation system 100 are discarded or set to zero.

If the text-to-video generative model 104 is to perform an inpainting task or an outpainting task (as indicated by mode indicator 102C), then the binary conditioner manager 410 identifies content to be generated using binary masks. For example, when the text-to-video generative model 104 performs an inpainting task, the video generation system 100 can receive an additional input indicating content to be added to one or more frames (e.g., filling in a region of a frame based on the user-selected region). The binary condition manager 410 can generate one or more binary masks of the dimension of the frames of the video 102A and set pixels in the region of a binary mask to a first value (e.g., a value of "0") corresponding to pixels of the region of the frame to be filled in or otherwise generated (e.g., the user-selected region). The binary condition manager 410 can set pixels of the region of the binary mask to a second value (e.g., a value of "1") corresponding to pixels of the region of the frame to be frozen (e.g., an unmodified region of the frame corresponding to content of the video 102A).

Similarly, when the text-to-video generative model 104 performs an outpainting task, the binary condition manager 410 can generate one or more binary masks of the dimension of a user-determined dimension and sets the values of pixels included in a dimension of the binary mask corresponding to the dimension of the frames of the video 102A to a first value (e.g., a value of "1") and sets the values of remaining pixels of the binary mask to a second value (e.g., a value of "0"). In this manner, the text-to-video generative model 104 generates new content for pixels set to a value (e.g., a value of "0") and freezes pixels of the frame that are set to a different value (e.g., a value of "1"). In other words, the text-to-video generative model 104 will generate content (while performing an inpainting task or an outpainting task) for pixels of a frame set to a value (e.g., a value of "0").

If the text-to-video generative model 104 is to perform a motion brush task (as indicated by mode indicator 102C), then the number of frames 106 of the video 102A is one and/or any additional frames other than a single frame received by the video generation system 100 are discarded or set to zero. In addition, the single frame received by the video generation system 100 is duplicated. Further, the binary masks generated by the binary conditioner manager 410 mask the region of the frame that is to be animated, where the region of the frame that is to be animated (e.g., an object) is received as a user input.

The text prompt 102D (if received as an input 102, for instance) is passed to encoder 404C. As described herein, the encoder 404C encodes the text prompt 102D and passes a latent space text representation (e.g., text embeddings) to the text-to-video generative model 104.

The text-to-video generative model 104 uses the inputs determined by the concatenator 408A, the concatenator 408B, and in some embodiments the encoder 404C to generate an extension of the video 102A (e.g., generated video 110) using stable diffusion or some other generative machine learning model technique.

Figure 5:
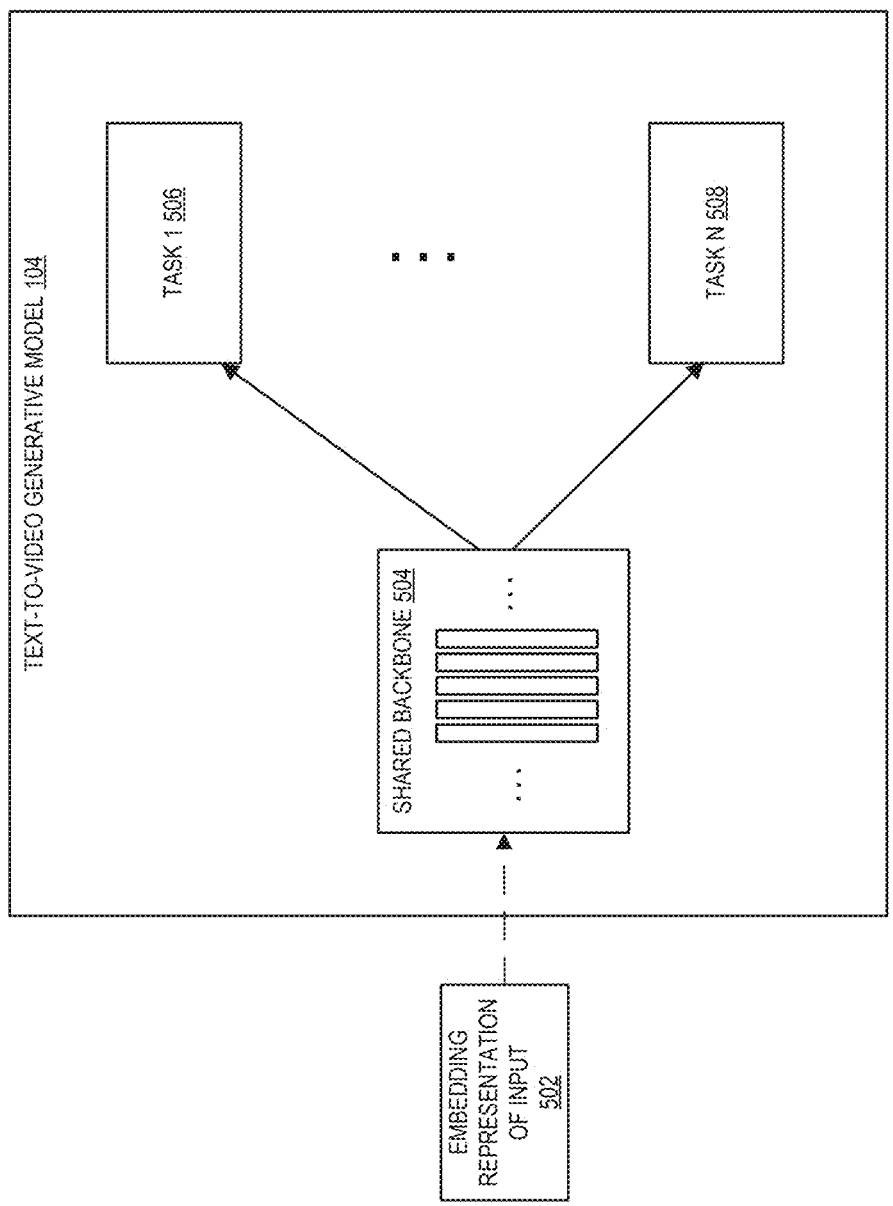
FIG. 5 illustrates the text-to-video generative model as a multitask model, in accordance with one or more embodiments.

FIG. 5 illustrates the text-to-video generative model as a multitask model, in accordance with one or more embodiments. Multitask learning is when a single machine learning model is trained to perform multiple tasks. A model that is trained using multitask learning includes one or more shared "backbone" layers (e.g., shared backbone 504) and "heads" (e.g., task 1 506 . . . task N 508) dedicated to perform each specific task. A head includes the layers of a machine learning model required to perform/learn the specific task associated with that head. Multitask learning improves efficiency of the text-to-video generative model 104 as each head receives the same set of features (or other information) determined from the shared backbone 504 of the text-to-video generative model 104. This efficient sharing is useful in cases where the multitask model learns related tasks. As described herein, tasks learned by the text-to-video generative model 104 are related tasks such as text-to-video, image-to-video, inpainting, outpainting, motion brush, and video extension, for example. Accordingly, as shown in example 500, the text-to-video generative model 104 can include one head for each task (e.g., task 1 506 to task N 508).

In some embodiments, each head of the text-to-video generative model 104 is trained to perform the task using a unique loss function during training. Training and loss functions are described in FIG. 7 described herein.

The embedding representation of an input 502 is passed to the text-to-video generative model 104. As described herein, the embedding representation can include a combination of noise frames and image embeddings of the video 102A, a combination of the mode indicator 102C and motion embeddings determined from the motion estimator 406, and/or a text embedding of the text prompt 102D described in FIG. 4. In some embodiments, the mode indicator 102C is used to select a head to be active. When the head is active, the head receives the information determined from the shared backbone 504 and performs the task associated with the head.

The shared backbone 504 of the multitask learning model is shown as a vertical arrangement of layers. Layers include neurons, and each neuron includes an activation function which is a nonlinear function that maps the input of the neuron to a latent space representation to better capture complex relationships of the input. Layers are interconnected using weights, which adjust the strength of the output of neurons of the layer. The value of the weights is tuned during a training period.

The shared backbone 504 can include layers configured to perform tasks such as convolution tasks, pooling tasks, encoding tasks, decoding tasks, and attention tasks, for instance. The information determined from the shared backbone 504 is passed to one or more active heads of the text-to-video generative model 104. An active head (e.g., a head that is activated responsive to the mode indicator, for instance) receives the information from the shared backbone 504 and performs the task in which it was trained to perform. Inactive heads (e.g., heads that are not active responsive to the mode indicator, for instance) do not receive information from the shared backbone. In some embodiments, the information determined from the shared backbone 504 is passed to multiple active heads of the text-to-video generative model 104.

Figure 6:
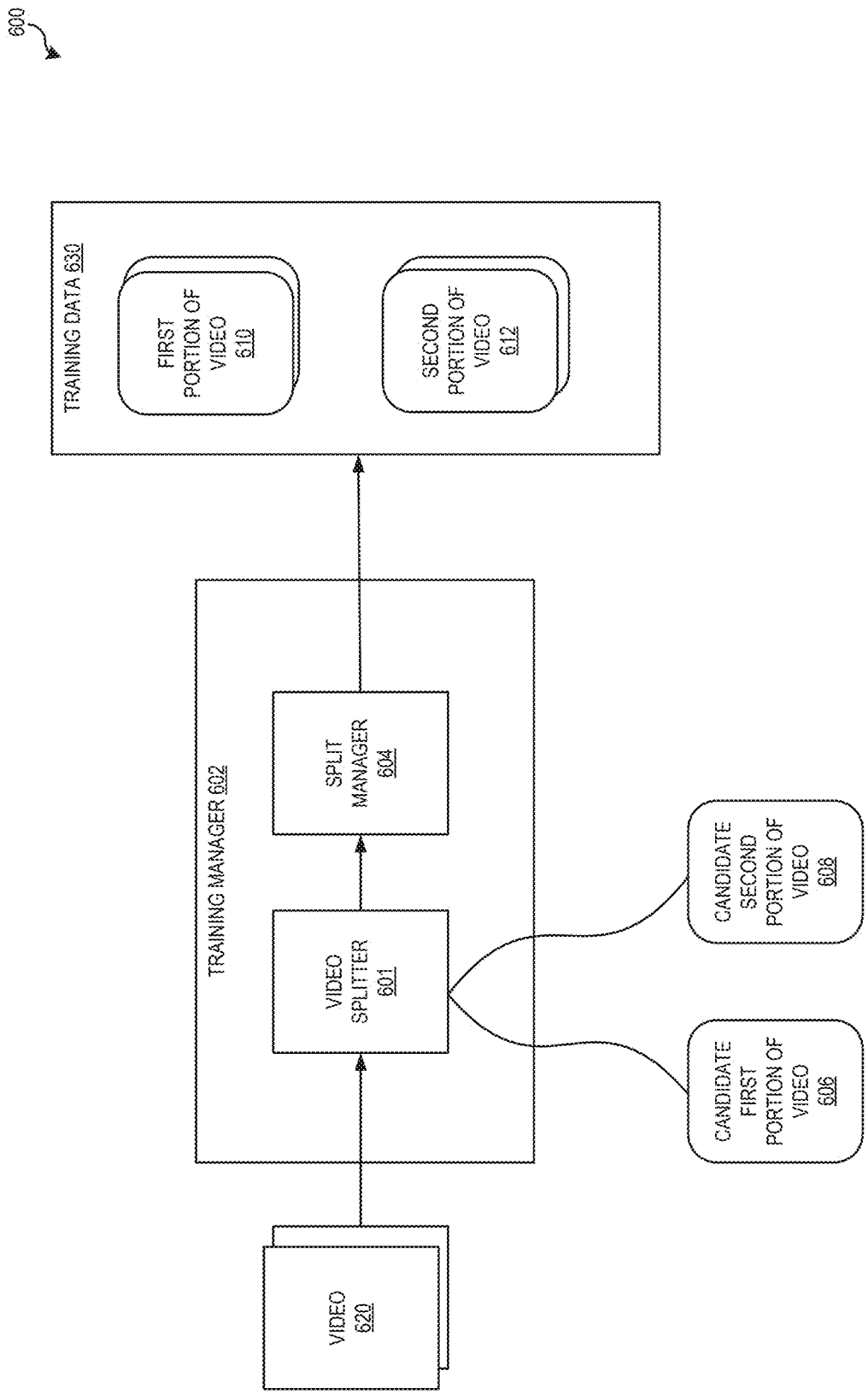
FIG. 6 illustrates an example of collecting training data used to train the text-to-video generative model to perform the video extension task, in accordance with one or more embodiments.

FIG. 6 illustrates an example of collecting training data used to train the text-to-video generative model to perform the video extension task, in accordance with one or more embodiments. As shown in example 600, the training manager 602 generates the training data 630 that is used for training the text-to-video generative model 104. In operation, the training data 630 is used to train the text-to-video generative model 104 to generate one or more frames to extend a video in the time domain.

Video 620 is a video used to generate training data. In some embodiments, video 620 is selected as a video used to generate training data based on one or more characteristics of video 620. For example, video 620 can include content that is slowly moving, as opposed to content that is moving quickly and/or content that changes quickly (e.g., people appearing suddenly in frames of the video 620). In some embodiments, multiple videos 620 are used to generate training data. The video splitter 601 partitions video 620 into two portions, candidate first portion of video 606 and candidate second portion of video 608. The candidate portions of the video (e.g., candidate first portion of video 606 and candidate second portion of video 608) can be any two neighboring sequential portions of the video 620. For example, the candidate first portion of the video 606 is a sequential first number of frames of the video 620. The candidate second portion of the video 608 is a neighboring set of a sequential second number of frames of the video 620. The candidate second portion of video 608 includes frames that are immediately adjacent to frames of the first portion of the video 610. For example, if the candidate first portion of video 606 includes frames 0-50 of video 620, the candidate second portion of video 608 includes frames 51-70 of video 620, for instance. Additionally or alternatively, if the candidate first portion of the video 606 includes frames 20-50 of video 620, then the candidate second portion of the video 608 includes frames 0-19 of video 620.

The split manager 604 determines whether the candidate first portion of video 606 and the candidate second portion of video 608 satisfy the criteria to become training data 630 (e.g., first portion of video 610 and second portion of video 612 respectively). The split manager 604 determines that candidate portions of video satisfy the criteria of training data 630 if the candidate second portion of video 608 is a smooth and predictable extension of the candidate first portion of video 606 (or vice-versa).

In operation, the split manager 604 determines an extendibility score associated with the candidate first portion of video 606 and the candidate second portion of video 608. If the extendibility score satisfies an extendibility threshold, then the candidate second portion of video 608 is an extension consistent with the content of the candidate first portion of video 606 (or vice-versa). That is, the candidate second portion of video 608 is a smooth and predictable extension of the candidate first portion of video 606. Accordingly, the candidate first portion of video 606 and the candidate second portion of video 608 are stored as training data (e.g., first portion of video 610 and second portion of video 612 respectively).

Each first portion of video 610 and second portion of video 612 are stored as a pair of training data in the set of training data 630. The training data 630 can be iteratively determined by identifying candidate first portions of videos and corresponding candidate second portions of videos whose extendibility score satisfies the extendibility threshold. The set of training data 630 can include portions of videos from multiple videos 620 and/or portions of videos from a single video 620.

If the extendibility score associated with the candidate first portion of video 606 and the candidate second portion of video 608 does not satisfy the extendibility threshold, then the candidate second portion of video 608 includes content that is abrupt or surprising (e.g., content that is not a smooth extension of the candidate first portion of video 606). For example, a new object can appear in the candidate second portion of video 608 with respect to the content of the candidate first portion of video 606.

If the extendibility score associated with the candidate portions does not satisfy the extendibility threshold, then training data 630 is generated using new candidate portions of video that are partitioned from the video 620 via the video splitter 601. For example, the video splitter 601 generates the candidate first portion of video 606 using a new sequence of frames (e.g., frames 100-150 of video 620) and the candidate second portion of video 608 is similarly generated (e.g., frames 151-170 of video 620). Additionally or alternatively, the training manager 602 generates training data 630 using a new video. That is, a new input video 620 is used to generate the candidate first portion of video 606 and the candidate second portion of video 608 respectively.

In operation, the split manager 604 encodes one or more frames of the candidate first portion of video 606 and one or more frames of the candidate second portion of video 608 to obtain corresponding one or more embeddings of frames of the candidate first portion of video 606 and one or more embedding of frames of the candidate second portion of video 608 respectively. As described herein, an embedding is a latent space representation of a frame that encodes characteristics or features of the frame in an embedding space. Frames with similar features, characteristics, or content are positioned in proximity in the embedding space. The embedding is a vector representation of the frame.

In some embodiments, the split manager 604 generates an embedding of the last frame of the frames of the candidate first portion of video 606. In these embodiments, the split manager 604 determines whether the candidate second portion of video 606 is a smooth extension of the end of the candidate first portion of video 606. For example, the candidate first portion of video 606 can include frames 0-50 of video 620 and the candidate second portion of video 608 can include frames 51-70 of video 620, for instance.

In other embodiments, the split manager 604 generates an embedding of the first frame of the frames of the candidate first portion of video 606. In these embodiments, the split manager 604 determines whether the candidate second portion of video 606 is a smooth extension of the beginning of the candidate first portion of video 606. For example, the candidate first portion of video 606 can include frames 20-50 of video 620, and the candidate second portion of the video 608 can include frames 0-19 of video 620.

In some embodiments, the split manager 604 generates embeddings of each frame of the candidate second portion of video 608. In other embodiments, the split manager 604 generates embeddings of equidistant frames of the candidate second portion of video 608. For example, the split manager 604 samples frames of the candidate second portion of video 608 every 0.5 seconds and encodes the sampled frames. For example, if the candidate second portion of video 608 is a duration of two seconds and the split manager 604 samples frames every 0.5 seconds, then the split manager 604 generates four embeddings corresponding to frames sampled and encoded at 0.5 seconds, 1 second, 1.5 seconds, and 2 seconds.

The split manager 604 compares one or more embeddings of the candidate second portion of video 608 (representing frames of the candidate second portion of video 608) to one or more embeddings of the candidate first portion of video 606 (representing frames of the candidate second portion of video 608) to determine a similarity of the frames of the candidate second portion of video 608 to frames of the candidate first portion of video 606. For example, the split manager 604 can use cosine similarity to compare each frame embedding of the candidate second portion of video 608 to a frame embedding of the candidate first portion of video 606. In operation, the value of the cosine of the angle between the compared embeddings indicates a similarity of the embeddings. For example, higher, positive values (closer to 1) indicate greater degrees of similarity and lower, negative values (closer to 0) indicate greater degrees of dissimilarity.

In some embodiments, the split manager 604 determines the average similarity of the embeddings of the candidate second portion of video 608 with one or more embeddings of the candidate first portion of video 606 (e.g., the embedding of the first frame or the embedding of the last frame of the candidate first portion of video 606). For example, the split manager 604 averages the cosine similarity score between embeddings of the candidate second portion of video 608 and embeddings of the candidate first portion of video 606. In this manner, the split manager 604 determines a robust measure of the consistency of the extended video (e.g., the candidate second portion of video 608) with respect to a frame of the candidate first portion of video 606 (e.g., the last frame or the first frame).

Because the extendibility score represents a similarity of embeddings of frames in embedding space, the extendibility score measures a semantic similarity of frames. In an example, because the extendibility score represents a semantic similarity of frames (and the extendibility score is not determined in pixel space, for instance) the extendibility score is robust to high intensity motion. In other words, the split manager 604 can determine that the candidate second portion of video 608 can be used as training data 630 with respect to the candidate first portion of video 606, even if the candidate second portion of video 608 includes a lot of movement, as long as the semantic content of the frames of the candidate second portion of video 608 satisfies an extendibility score threshold with respect to the semantic content of the frames of the candidate first portion of video 606.

In some embodiments, the extendibility score determined by the split manager 604 is a value between 0-1, where higher scores correspond to an increased likelihood that the candidate second portion of video 608 is an extension of the content of the candidate first portion of video 606. Lower extendibility scores correspond to an increased likelihood that the candidate second portion of video 608 is abrupt or surprising (e.g., not an extension of the content) with respect to the content of the candidate first portion of video 606.

Figure 7:
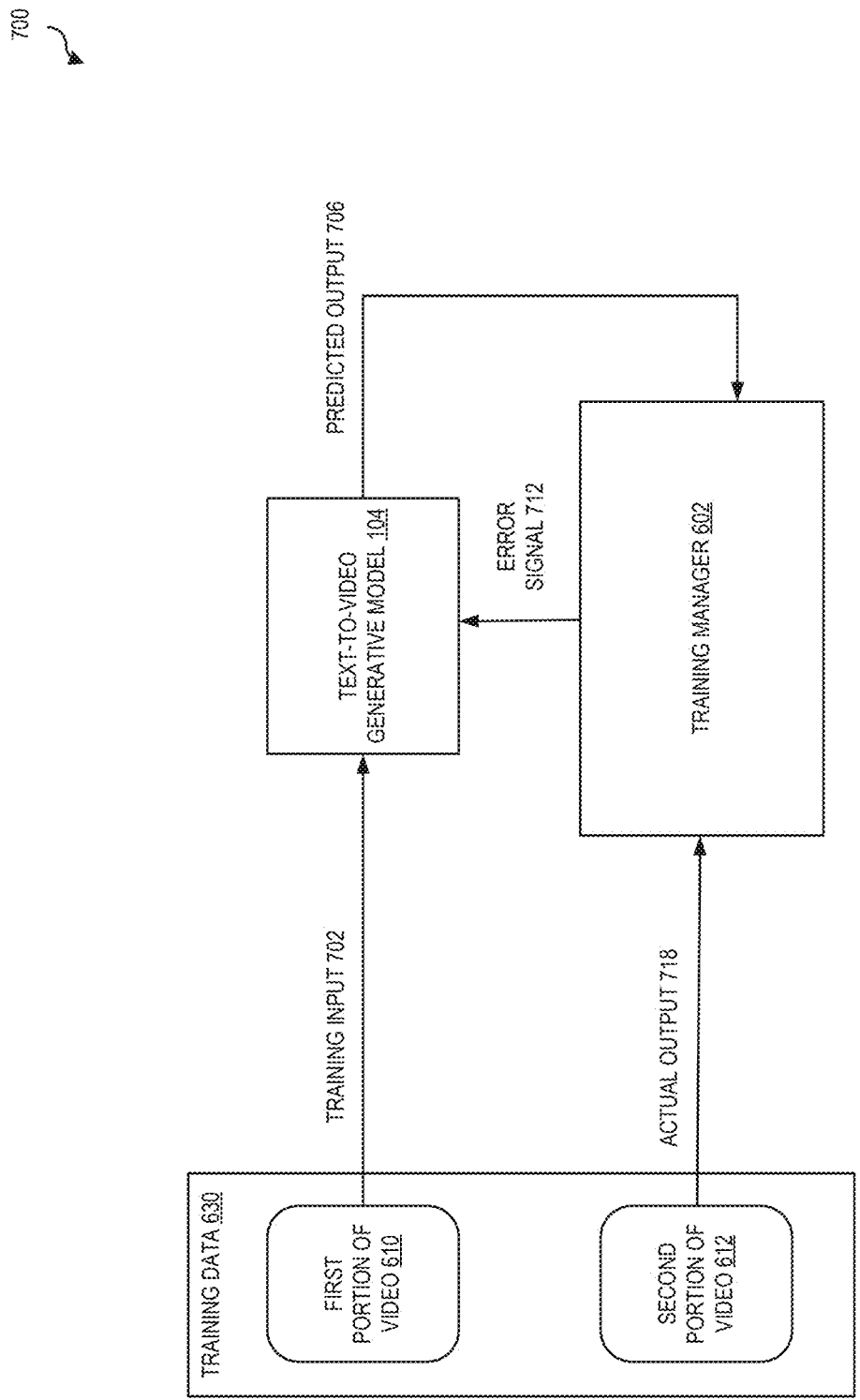
FIG. 7 is an example of training the text-to-video generative model using supervised learning, in accordance with one or more embodiments.

FIG. 7 is an example of training the text-to-video generative model using supervised learning, in accordance with one or more embodiments. As described herein, the text-to-video generative model can be a modified text-to-image generative model. During training, temporal layers and/or temporal attention layers of the modified text-to-image generative model can be updated using the training manager 602 and supervised learning. In some embodiments, the other layers of the text-to-video generative model 104 are not updated during training (e.g., the spatial layers of the text-to-image generative model).

Supervised learning is a method of training a machine learning model given input-output pairs. An input-output pair (e.g., training input 702 and corresponding actual output 718) is an input with an associated known output (e.g., an expected output, a labeled output, a ground truth). An actual output 718 may be portion of a video that has satisfied the extendibility score threshold with respect to the training input 702. That is, the training input 702 and corresponding actual output 718 can be a pair of training data such as a first portion of video 610 and a second portion of video 612.

The text-to-video generative model 104 receives the training input 702 and predicts output 706 by applying nodes in one or more layers of the text-to-video generative model 104 to the training input 702. As described herein, a layer may refer to a sub-structure of the text-to-video generative model 104. Layers include a number of nodes (e.g., neurons) that perform a particular computation and are interconnected to nodes of adjacent layers. Nodes in each of the layers sum up values from adjacent nodes and apply an activation function, allowing the layers to detect nonlinear patterns. Nodes are interconnected by weights, which are adjusted based on an error determined by comparing the actual output 718 to the predicted output 706. The adjustment of the weights during training facilitates the text-to-video generative model 104 ability to generate smooth and predictable video extension frames (e.g., generated frames that contain subject matter that is semantically similar to the subject matter of the first portion of video 610). In operation, the training manager 602 compares the predicted output 706 to the actual expected (e.g., ground truth) output 718 to determine an amount of error or difference between the predicted output 706 and the actual output 718.

As shown in example 700, the error (represented by error signal 712) is determined by comparing the predicted output 706 (e.g., one or more generated video extension frames) to the actual output 718 (e.g., one or more frames of the second portion of video 612) using the training manager 602. In other embodiments (not shown), the training manager 602 evaluates the predicted output 706 using the extendibility score. For example, the training manager 602 uses cosine similarity to compare one or more embeddings of the training input 702 to one or more embeddings of the predicted output 706 to determine a semantic similarity of the frames of the predicted output 706 to frames of the first portion of video 610 (e.g., training input 702). In this manner, the training manager 602 can determine a score (e.g., a cosine similarity score) associated with whether the predicted output 706 is a smooth and predictable extension of the training input 702. That is, the text to video model did not create any new content in the predicted output 706 with respect to the content of the training input 702. In these embodiments, the score is used as the error signal 712.

Additionally or alternatively, the training manager 602 evaluates the predicted output using the extendibility score with respect to the semantic variance of the predicted output 706. For example, the training manager 602 uses cosine similarity to compare one or more embeddings of the predicted output 706 to one or more embeddings of the predicted output 706 to determine a semantic similarity of the frames of the predicted output 706. For example, the last (or first) frame of the predicted output 706 is evaluated with respect to sampled frames of the predicted output 706. In this manner, the training manager 602 can determine a score (e.g., a cosine similarity score) associated with whether the predicted output 706 is a smooth and predictable extension. That is, the text to video model did not create any new content in the predicted output 706 in any of the frames of the predicted output 706. In these embodiments, the score is used as the error signal 712.

The error signal 712 is used to adjust the weights in the temporal layers of the text-to-video generative model 104 such that after a set of training iterations the text-to-video generative model 104 converges, e.g., changes (or learns) over time to generate acceptably accurate (e.g., accuracy satisfies a defined tolerance or confidence level) predicted output 706 using the input-output pairs.

The text-to-video generative model 104 may be trained using a backpropagation algorithm, for instance. The backpropagation algorithm operates by propagating the error signal 712 through the layers of the text-to-video generative model 104. The error signal 712 may be calculated each iteration (e.g., each pair of training inputs 702 and associated actual outputs 718), batch, and/or epoch and propagated through the algorithmic weights in the text-to-video generative model 104 such that the algorithmic weights adapt based on the amount of error. The error is computed using a loss function. Non-limiting examples of loss functions may include the square error function, the root mean square error function, and the like.

In some embodiments, a different loss function is used to train the text-to-video generative model 104 to perform different tasks (e.g., the text to video generation, image to video generation, inpainting, outpainting, motion brush, and video extension tasks described herein). That is, the comparator 710 may determine the error between the actual output 718 and the predicted output 706 using different loss functions for different heads of the text-to-video generative model 104, where each head is trained to perform a task.

In some embodiments, training the text-to-video generative model 104 to perform different tasks includes using different sets of training data. In some embodiments, the training data is generated (e.g., as described in FIG. 6) for the different tasks using different videos. For example, training the text-to-video generative model 104 to perform the inpainting and/or outpainting task can include using training data generated from videos with objects (e.g., as opposed to videos of landscapes, for instance).

The weighting coefficients of the text-to-video generative model 104 (e.g., the weighting coefficients of the temporal layers) may be tuned to reduce the amount of error thereby minimizing the differences between (or otherwise converging) the predicted output 706 and the actual output 718. The text-to-video generative model 104 may be trained until the error determined at the comparator 710 is within a certain threshold (or a threshold number of batches, epochs, or iterations have been reached).

Figure 8:
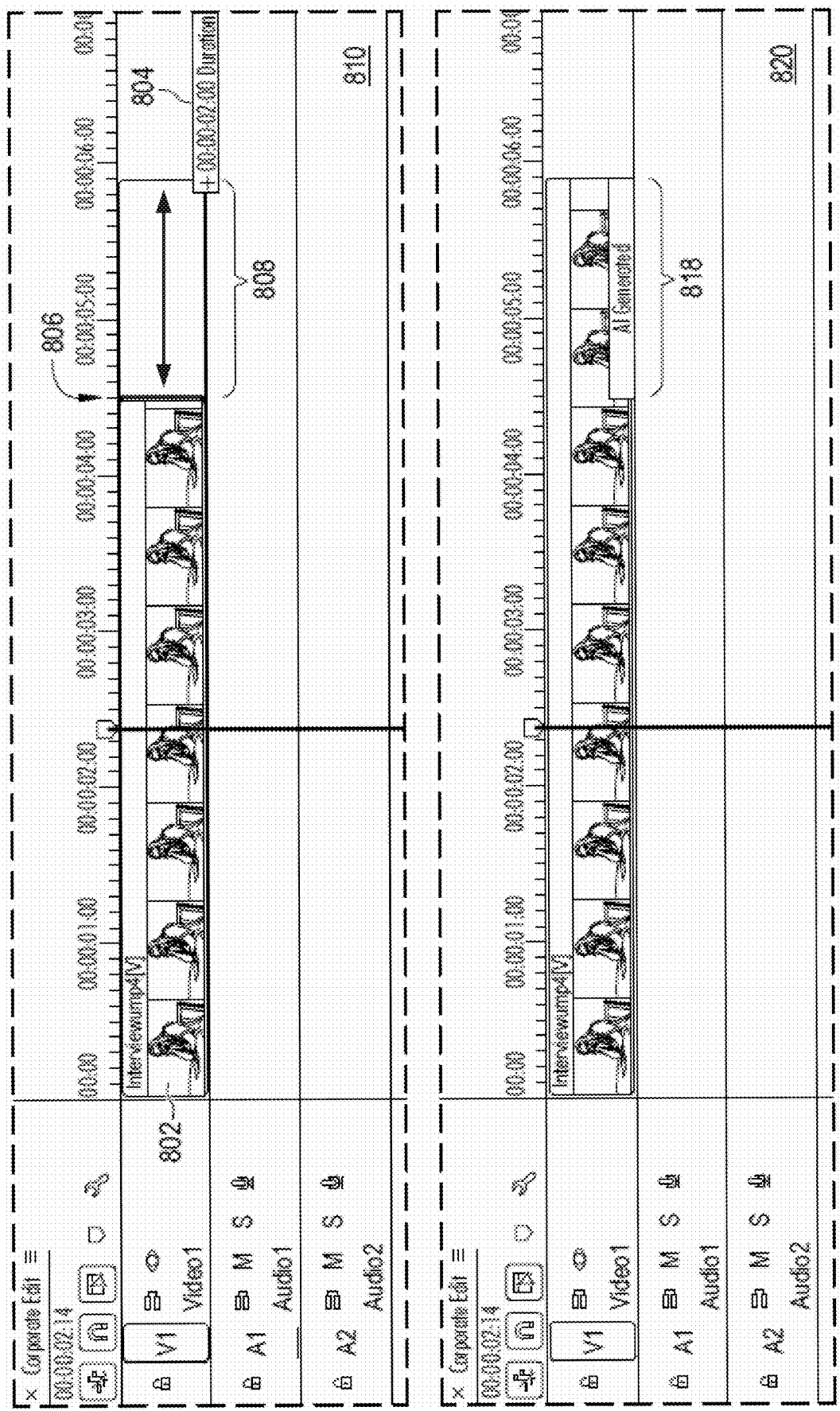
FIG. 8 illustrates an example graphical user interface in accordance with one or more embodiments.

FIG. 8 illustrates example graphical user interfaces in accordance with one or more embodiments. FIG. 8 illustrates a graphical user interface 810 at a first time period and a graphical user interface 820 at a second time period. Both graphical user interface 810 and graphical user interface 820 include a channel portion (represented as "Video 1") that presents frames of the video to be extended (e.g., video 802) to a user. As shown, video 802 includes frames of a video. Above each frame is a sequence of timestamps that illustrates frames and their corresponding timestamps. In graphical user interface 810, the video ends at four and a half seconds (as indicated by the time stamp illustrated by 806).

The user can interact with a user interface element (such as a slider or other user interface element) to indicate a duration of extension of the video 802. In other words, the duration of extension (e.g., represented visually as 808) is interaction data that depends on the user's interaction with the user interface element. For example, if the user interface element is a slider, the more the user slides the user interface element, the longer the extension of the video 802. As shown, a user interacts with the user interface element to slide or drag the user interface element to a target duration of extension. As shown at 804, the duration of extension is illustrated as a pop-up, indicating that the user is seeking to add two seconds to the duration of the video 802.

The interaction with the user interface element can cause a visual change to the user interface element which represents a duration of extension to be made to the video. For example, the duration of extension is visually illustrated as 808. In some embodiments, an overlay is applied to the white space of the graphical user interface 810 to contrast the user-determined duration of extension 808 with the graphical user interface. In some embodiments, the graphical user interface indicates the duration of extension to the user (e.g., pop-up 804).

The video generation system described herein receives the video 802 (or more specifically, a number of frames of the video 802) and generates video extension frames according to the duration of extension 808 (e.g., generated video 110 described in FIG. 1).

Graphical user interface 820 illustrates an updated graphical user interface after the video generation system has generated the video extension frames. As shown, the generated video is illustrated using the channel portion of the graphical user interface. That is, generated video extension frames 818 are integrated with the video 802 according to the user's preferred duration and the user's preferred location of the video. In some embodiments, the generated video extension frames 818 are overlayed with an indicator that informs the user that the frames are generated using a machine learning model (e.g., the text-to-video generative model 104 described in FIG. 1). As shown, the generated video extension frames 818 are smooth and predictable with respect to the content included in the frames of the video 802. That is, the generated content does not include new or surprising subject matter.

In some embodiments (not shown), the graphical user interface includes a user interface element that allows a user to select a mode of operation. For example, the user can selected from a text-to-video mode, an image-to-video mode, an inpainting mode, an outpainting mode, a motion brush mode, or a video extension mode. As described herein, the text-to-video generative model 104 performs a task corresponding to the user selected mode.

Figure 9:
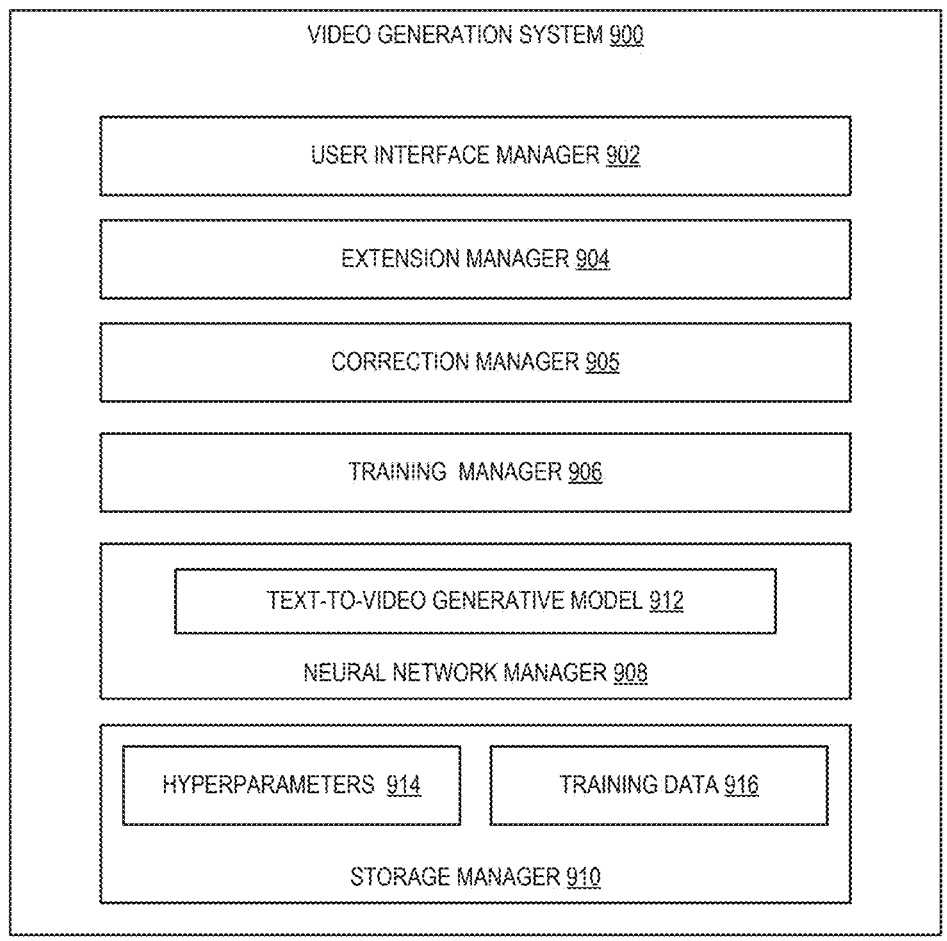
FIG. 9 illustrates a schematic diagram of video generation system in accordance with one or more embodiments.

FIG. 9 illustrates a schematic diagram of video generation system (e.g., "video generation system" described above) in accordance with one or more embodiments. As shown, the video generation system 900 may include, but is not limited to, a user interface manager 902, an extension manager 904, a training manager 906, a neural network manager 908, and a storage manager 910. The neural network manager 908 includes a text-to-video generative model 912. The storage manager 910 includes hyperparameters 914 and training data 916.

As illustrated in FIG. 9, the video generation system 900 includes a user interface manager 902. For example, the user interface manager 902 allows users to provide input videos (e.g., videos to be extended) to the video generation system 900. In some embodiments, the user interface manager 902 provides a user interface element through which the user can upload the input videos (or an input image). Alternatively, or additionally, the user interface may enable the user to download the videos/images from a local or remote storage location (e.g., by providing an address (e.g., a URL or other endpoint) associated with a video source or an image source). In some embodiments, the user interface can enable a user to link a capture device, such as a camera or other hardware to capture video data and/or image data, and provide the data to the video generation system 900.

Additionally, the user interface manager 902 provides access to a graphical user interface that includes one or more user interface elements. The graphical user interface allows users to request a mode of the video generation system using a user interface element. Modes that can be selected by the user include a text to video generation mode, an image to video generation mode, an inpainting mode, an outpainting mode, a motion brush mode, a video extension mode, and the like. The graphical user interface also allows a user to indicate a duration of extension using a user interface element. For example, as described herein, a user can drag a slider that represents a duration of video extension to be generated by the video generation system. The graphical user interface also includes a user interface element that allows the user to view the video (or an input image). After the video generation system has generated video extension frames, as described herein, the generated video extension frames are integrated with the video using the same user interface element. As a result, the generated video extension frames are seamlessly integrated with the video. The user interface manager 902 allows the user to view the integrated video using the graphical user interface and request further video extensions.

As illustrated in FIG. 9, the video generation system 900 includes an extension manager 904. The extension manager 904 arranges the generated video (e.g., generated video extension frames) with respect to the video being extended. For example, the extension manager 904 can increase the duration of video being extended in the time domain by adding the generated video to the beginning of the video, the end of video, or some other location of video. In operation, the extension manager 904 combines the generated video with the video to obtain an extended video. For example, the extension manager 904 can concatenate the frames of the generated video (e.g., video extension frames) with the frames of the video being extended to obtain the extended video.

As illustrated in FIG. 9, the video generation system 900 includes a correction manager 905. The correction manager 905 calibrates features of the frames of the generated video using features of the input video. For example, one or more visual statistics of frames of the generated video are calibrated with respect to visual statistics of frames of the input video (e.g., brightness, contrast, etc.). The generated video referred to herein includes the calibrated features (e.g., corrected frames) of the generated video with respect to the input video.

As illustrated in FIG. 9 the video generation system 900 also includes training manager 906. The training manager 906 can teach, guide, tune, and/or train one or more neural networks. In particular, the training manager 906 can train a neural network based on a plurality of training data. For example, the text-to-video generative model 912 may be trained to generate temporally coherent video frames (e.g., generated video extension frames of the generated video 110 described in FIG. 1). As described herein, the text-to-video generative model 912 can include temporal layers and temporal attention layers that are used to modify a text-to-image generative model. In some embodiments, the hyperparameters of the text-to-image generative model are frozen, and the training manager 906 updates hyperparameters of the temporal layers and temporal attention layers during a training period to obtain the text-to-video generative model 912. During deployment of the text-to-video generative model 912, one or more classifier-free guidance (CFG)

functions can be used to combine multiple generated video frames determined from the text-to-video generative model 912. In some implementations, the hyperparameters of the CFG can be tuned by the training manager 906 during training.

The training manager 906 can also be used to generate training data 916 as described herein. For example, the training manager 906 partitions a video into sequential and neighboring candidate portions and determines whether the candidate portions are smooth and predictable extensions of each other. In operation, an extendibility score is used to evaluate whether the sequential and neighboring candidate portions are smooth and predictable extensions of each other. If the extendibility score satisfies an extendibility threshold, then the candidate second portion of video is an extension consistent with the content of the candidate first portion of video (or vice-versa).

As illustrated in FIG. 9, the video generation system 900 also includes a neural network manager 908. Neural network manager 908 may host a plurality of neural networks or other machine learning models, such as text-to-video generative model 912. The neural network manager 908 may include an execution environment, libraries, and/or any other data needed to execute the machine learning models. In some embodiments, the neural network manager 908 may be associated with dedicated software and/or hardware resources to execute the machine learning models.

As discussed, the text-to-video generative model 912 can be implemented as a modified text-to-image generative model. The text-to-video generative model 912 determines motion information from frames (e.g., a number of frames input to the text-to-video generative model 912) to generate the temporally coherent frames. The generated frames (e.g., the generated video extension frames) are temporally coherent because they are generated in such a way that causes the content depicted in the frames to appear visually consistent with the content of the video being extended. That is, the generated extension frames include content that is not choppy with respect to the content of the video being extended. The frames are also coherent because they do not include subject matter that is new or surprising with respect to the content of the video being extended.

As illustrated in FIG. 9, the video generation system 900 also includes the storage manager 910. The storage manager 910 maintains data for the video generation system 900. The storage manager 910 can maintain data of any type, size, or kind as necessary to perform the functions of the video generation system 900. The storage manager 910, as shown in FIG. 9, includes hyperparameters 914. Hyperparameters can include information associated with the temporal layers of the text-to-video generative model 912 (e.g., weights, a number of neurons, a number of layers, etc.). As further illustrated in FIG. 9, the storage manager 910 also includes training data 916. Training data 916 includes two neighboring portions of training videos that are smooth and predictable. That is, pairs of portions of training videos are stored as training data if the portions of the training videos satisfy an extendibility score. Satisfying the extendibility score represents portions of training videos that include subject matter that is consistent (e.g., no surprising new objects). Such training data is used to train the text-to-video generative model 912 to generate video extension frames that include subject matter that is consistent with respect to the input video.

Each of the components 902-910 of the video generation system 900 and their corresponding elements (e.g., elements 912-916) may be in communication with one another using any suitable communication technologies. It will be recognized that although components 902-910 and their corresponding elements are shown to be separate in FIG. 9, any of components 902-910 and their corresponding elements may be combined into fewer components, such as into a single facility or module, divided into more components, or configured into different components as may serve a particular embodiment.

The components 902-910 and their corresponding elements can comprise software, hardware, or both. For example, the components 902-910 and their corresponding elements can comprise one or more instructions stored on a computer-readable storage medium and executable by processors of one or more computing devices. When executed by the one or more processors, the computer-executable instructions of the video generation system 900 can cause a client device and/or a server device to perform the methods described herein. Alternatively, the components 902-910 and their corresponding elements can comprise hardware, such as a special purpose processing device to perform a certain function or group of functions. Additionally, the components 902-910 and their corresponding elements can comprise a combination of computer-executable instructions and hardware.

Furthermore, the components 902-910 and their corresponding elements of the video generation system 900 may, for example, be implemented as one or more stand-alone applications, as one or more modules of an application, as one or more plug-ins, as one or more library functions or functions that may be called by other applications, and/or as a cloud-computing model. Thus, the components 902-910 and their corresponding elements of the video generation system 900 may be implemented as a stand-alone application, such as a desktop or mobile application. Furthermore, the components 902-910 and their corresponding elements of the video generation system 900 may be implemented as one or more web-based applications hosted on a remote server. Alternatively, or additionally, the components of the video generation system 900 may be implemented in a suite of mobile device applications or "apps."

As shown, the video generation system 900 can be implemented as a single system. In other embodiments, the video generation system 900 can be implemented in whole, or in part, across multiple systems. For example, one or more functions of the video generation system 900 can be performed by one or more servers, and one or more functions of the video generation system 900 can be performed by one or more client devices. The one or more servers and/or one or more client devices may generate, store, receive, and transmit any type of data used by the video generation system 900, as described herein.

In one implementation, the one or more client devices can include or implement at least a portion of the video generation system 900. In other implementations, the one or more servers can include or implement at least a portion of the video generation system 900. For instance, the video generation system 900 can include an application running on the one or more servers or a portion of the video generation system 900 can be downloaded from the one or more servers. Additionally or alternatively, the video generation system 900 can include a web hosting application that allows the client device(s) to interact with content hosted at the one or more server(s).

For example, upon a client device accessing a webpage or other web application hosted at the one or more servers, in one or more embodiments, the one or more servers can provide access to a user interface displayed at a client device. The user interface displayed at the client device can prompt the user to select a mode of a machine learning model such as the video generation system. Based on the selected mode, additional information is requested from the user, as described herein. For example, in some embodiments, the user interface displayed at the client device includes a user interface element that allows the user to indicate a duration of a video extension of an input video. The client device can provide the received duration of the video extension and the input video to one or more servers, which can automatically perform the methods and processes described herein to generate video extension frames of a duration equal to the duration of the video extension. The one or more servers can then provide access to the user interface displayed at the client device to display the extended video including the input video and the frames of the generated extension of the input video.

The server(s) and/or client device(s) may communicate using any communication platforms and technologies suitable for transporting data and/or communication signals, including any known communication technologies, devices, media, and protocols supportive of remote data communications, examples of which will be described in more detail below with respect to FIG. 11. In some embodiments, the server(s) and/or client device(s) communicate via one or more networks. A network may include a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. The one or more networks will be discussed in more detail below with regard to FIG. 11.

The server(s) may include one or more hardware servers (e.g., hosts), each with its own computing resources (e.g., processors, memory, disk space, networking bandwidth, etc.) which may be securely divided between multiple customers (e.g. client devices), each of which may host their own applications on the server(s). The client device(s) may include one or more personal computers, laptop computers, mobile devices, mobile phones, tablets, special purpose computers, TVs, or other computing devices, including computing devices described below with regard to FIG. 11.

Figure 10:
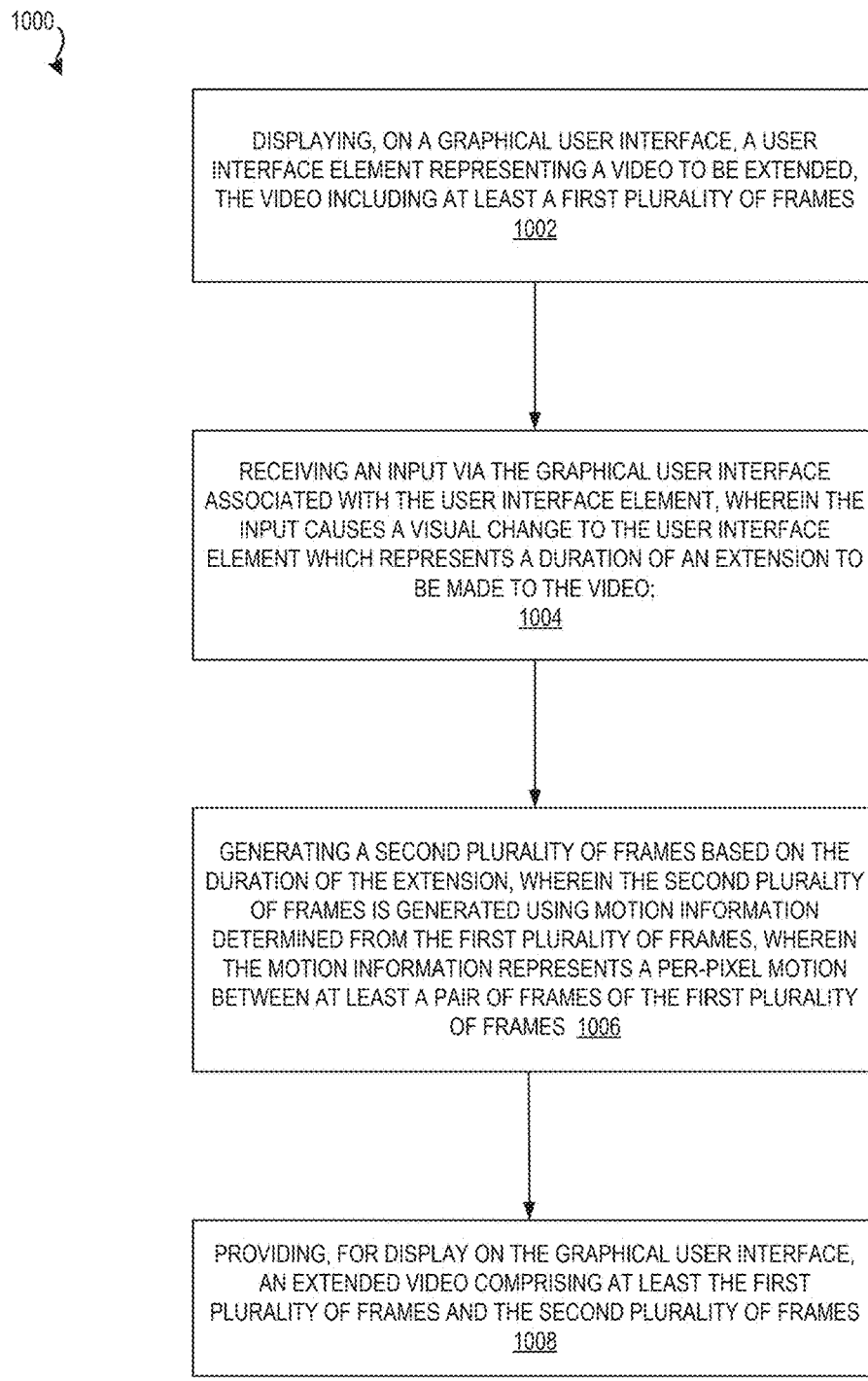
FIG. 10 illustrates a flowchart of a series of acts in a method of generating a temporally coherent video extension in accordance with one or more embodiments.

FIGS. 1-9, the corresponding text, and the examples, provide a number of different systems and devices that allows a user to generate a temporally coherent video extension. In addition to the foregoing, embodiments can also be described in terms of flowcharts comprising acts and steps in a method for accomplishing a particular result. For example, FIG. 10 illustrates a flowchart of an exemplary method in accordance with one or more embodiments. The method described in relation to FIG. 10 may be performed with fewer or more steps/acts or the steps/acts may be performed in differing orders. Additionally, the steps/acts described herein may be repeated or performed in parallel with one another or in parallel with different instances of the same or similar steps/acts.

FIG. 10 illustrates a flowchart of a series of acts in a method of generating a temporally coherent video extension in accordance with one or more embodiments. In one or more embodiments, the method 1000 is performed in a digital medium environment that includes the video generation system 900. The method 1000 is intended to be illustrative of one or more methods in accordance with the present disclosure and is not intended to limit potential embodiments. Alternative embodiments can include additional, fewer, or different steps than those articulated in FIG. 10.

As illustrated in FIG. 10, the method 1000 includes an act 1002 of displaying, on a graphical user interface, a user interface element representing a video to be extended, the video including at least a first plurality of frames. For example, the graphical user interface can include a "channel portion" that includes frames of the video to be extended. (e.g., the user interface element representing a video to be extended). The video includes frames (e.g., a first plurality of frames).

As illustrated in FIG. 10, the method 1000 includes an act 1004 of receiving an input via the graphical user interface associated with the user interface element. For example, a user's interaction with the user interface element of the graphical user interface is interaction data that indicates how the user interacted with the user interface element. The input (e.g., interaction data) causes a visual change to the user interface element which represents a duration of an extension to be made to the video. For example, a duration of extension can be visually illustrated using the graphical user interface.

As illustrated in FIG. 10, the method 1000 includes an act 1006 of generating a second plurality of frames based on the duration of the extension. In some implementations, the duration of extension is a unit of time (e.g., seconds, milliseconds, etc.). The duration of extension can be converted into a number of video extension frames to be generated by combining the duration of extension with a frame rate (e.g., a number of frames per second). In some implementations, the frame rate is received as a user preference. In other embodiments, the frame rate is determined based on the video to be extended.

The second plurality of frames are generated using a text-to-video generative model and motion information determined from the first plurality of frames. For example, frames of the video are converted into an optical flow using any more or more suitable techniques. The optical flow, or the motion information, represents a per-pixel motion between at least a pair of frames of the first plurality of frames.

As illustrated in FIG. 10, the method 1000 includes an act 1008 of providing, for display on the graphical user interface, an extended video comprising at least the first plurality of frames and the second plurality of frames. The extended video includes frames of the video (e.g., the first plurality of frames) that are nested with the generated video extension frames (e.g., the second plurality of frames) such that the extended video appears visually as a seamless integration of the video with the generated video. As described herein, the extension of the video occurs in the time domain. For example, the second plurality of frames can be combined with the first plurality of frames to increase the duration of the video. In some implementations, a beginning of the video is extended (e.g., the first plurality of frames occurs at the beginning of the video such that the second plurality of frames concatenated with the first plurality of frames extends the duration of the video at the beginning). In other implementations, an end of the video is extended (e.g., the first plurality of frames occurs at the end of the video such that the second plurality of frames concatenated with the first plurality of frames extends the duration of the video at the end). In yet other implementations, other portions of the video are extended. s Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other non-transitory storage medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
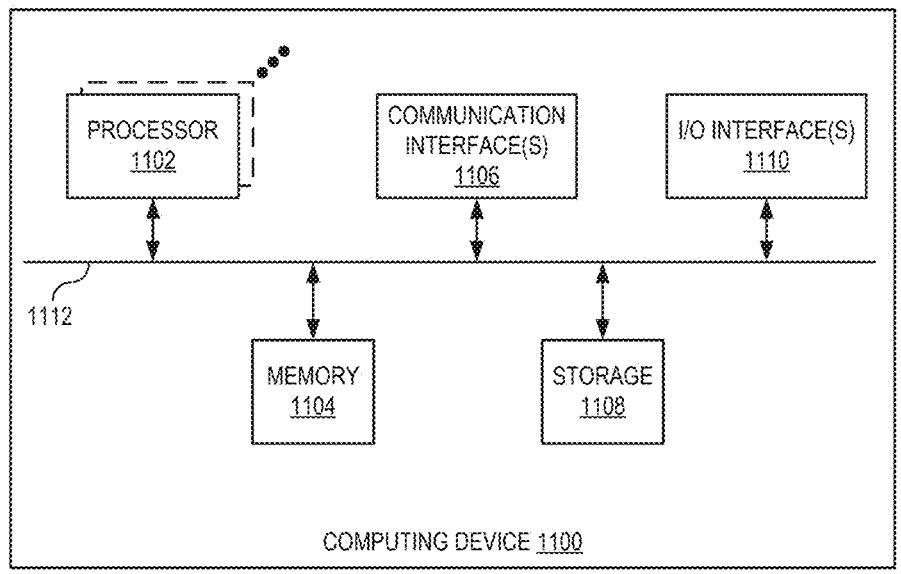
FIG. 11 illustrates a block diagram of an exemplary computing device in accordance with one or more embodiments.

FIG. 11 illustrates, in block diagram form, an exemplary computing device that may be configured to perform one or more of the processes described above. One will appreciate that one or more computing devices such as the computing device 1100 may implement the video generation system. As shown by FIG. 11, the computing device can comprise a processor 1102, memory 1104, one or more communication interfaces 1106, a storage device 1108, and one or more I/O devices/interfaces 1110. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1108 and decode and execute them. In various embodiments, the processor(s) 1102 may include one or more central processing units (CPUs), graphics processing units (GPUs), field programmable gate arrays (FPGAs), systems on chip (SoC), or other processor(s) or combinations of processors.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1104 may be internal or distributed memory.

The computing device 1100 can further include one or more communication interfaces 1106. A communication interface 1106 can include hardware, software, or both. The communication interface 1106 can provide one or more interfaces for communication (such as, for example, packet-based communication) between the computing device and one or more other computing devices 1100 or one or more networks. As an example and not by way of limitation, communication interface 1106 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can comprise hardware, software, or both that couples components of computing device 1100 to each other.

The computing device 1100 includes a storage device 1108 includes storage for storing data or instructions. As an example, and not by way of limitation, storage device 1108 can comprise a non-transitory storage medium described above. The storage device 1108 may include a hard disk drive (HDD), flash memory, a Universal Serial Bus (USB) drive or a combination these or other storage devices. The computing device 1100 also includes one or more input or output ("I/O") devices/interfaces 1110, which are provided to allow a user to provide input to (such as user strokes), receive output from, and otherwise transfer data to and from the computing device 1100. These I/O devices/interfaces 1110 may include a mouse, keypad or a keyboard, a touch screen, camera, optical scanner, network interface, modem, other known I/O devices or a combination of such I/O devices/interfaces 1110. The touch screen may be activated with a stylus or a finger.

The I/O devices/interfaces 1110 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1110 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
   displaying, on a graphical user interface, a user interface element representing a video to be extended, the video including at least a first plurality of frames;
   receiving an input via the graphical user interface associated with the user interface element, wherein the input causes a visual change to the user interface element which represents a duration of an extension to be made to the video;
   generating a second plurality of frames based on the duration of the extension, wherein the second plurality of frames is generated using motion information determined from the first plurality of frames, wherein the motion information represents a per-pixel motion between at least a pair of frames of the first plurality of frames; and
   providing, for display on the graphical user interface, an extended video comprising at least the first plurality of frames and the second plurality of frames.

2. The method of claim 1, wherein the second plurality of frames is generated using a video generation model, further comprising:
   receiving, by the video generation model, a subset of frames of the first plurality of frames.

3. The method of claim 2, wherein generating the second plurality of frames further comprises:
   receiving, by the video generation model, a sequence of noise frames, wherein a number of the sequence of noise frames corresponds to the duration of extension.

4. The method of claim 1, wherein the motion information is an optical flow.

5. The method of claim 1, further comprising:
   receiving, via a second user interface element of the graphical user interface, a mode indicator, wherein the mode indicator indicates one of a text-to-video task, an image-to-video task, an inpainting task, an outpainting task, a motion brush task, or a video extension task.

6. The method of claim 1, wherein generating the second plurality of frames further comprises using a video generation model, wherein the video generation model comprises one or more temporal layers.

7. The method of claim 6, wherein the video generation model is configured to perform a text-to-video task, an image-to-video task, an inpainting task, an outpainting task, a motion brush task, and a video extension task.

8. A non-transitory computer-readable medium storing executable instructions, which when executed by a processing device, cause the processing device to perform operations comprising:
   displaying, on a graphical user interface, a user interface element representing a video to be extended, the video including at least a first plurality of frames;
   receiving an input via the graphical user interface associated with the user interface element, wherein the input causes a visual change to the user interface element which represents a duration of an extension to be made to the video;
   generating a second plurality of frames based on the duration of the extension, wherein the second plurality of frames is generated using motion information determined from the first plurality of frames, wherein the motion information represents a per-pixel motion between at least a pair of frames of the first plurality of frames; and
   providing, for display on the graphical user interface, an extended video comprising at least the first plurality of frames and the second plurality of frames.

9. The non-transitory computer-readable medium of claim 8, wherein the second plurality of frames is generated using a video generation model and the non-transitory computer-readable medium stores instructions that further cause the processing device to perform operations comprising:
   receiving, by the video generation model, a subset of frames of the first plurality of frames.

10. The non-transitory computer-readable medium of claim 9, wherein generating the second plurality of frames further comprises the non-transitory computer-readable medium storing instructions that further cause the processing device to perform operations comprising:
   receiving, by the video generation model, a sequence of noise frames, wherein a number of the sequence of noise frames corresponds to duration of extension.

11. The non-transitory computer-readable medium of claim 8, wherein the motion information is an optical flow.

12. The non-transitory computer-readable medium of claim 8, storing instructions that further cause the processing device to perform operations comprising:
   receiving, via a second user interface element of the graphical user interface, a mode indicator, wherein the mode indicator indicates one of a text-to-video task, an image-to-video task, an inpainting task, an outpainting task, a motion brush task, or a video extension task.

13. The non-transitory computer-readable medium of claim 8, wherein generating the second plurality of frames further comprises the non-transitory computer-readable medium storing instructions that further cause the processing device to perform operations comprising using a video generation model, wherein the video generation model comprises one or more temporal layers.

14. The non-transitory computer-readable medium of claim 13, wherein the video generation model is configured to perform a text-to-video task, an image-to-video task, an inpainting task, an outpainting task, a motion brush task, and a video extension task.

15. A system comprising:
   a memory component; and
   a processing device coupled to the memory component, the processing device to perform operations comprising:
      receiving a first plurality of frames of a video;
      generating, by a video generation model, a second plurality of frames based on the first plurality of frames;
      combining the first plurality of frames and the second plurality of frames to obtain an extension of the video; and
      providing, for display on a graphical user interface, the extension of the video.

16. The system of claim 15, wherein the processing device performs further operations comprising:
   receiving interaction data from a graphical user interface, wherein the interaction data indicates that a user interacted with a user interface element of the graphical user interface;
   determining a number of frames to be added to the first plurality of frames based on the interaction data, wherein the second plurality of frames corresponds to the number of frames to be added.

17. The system of claim 16, wherein generating, by the video generation model, the second plurality of frames of the video further comprises operations comprising:
   receiving a sequence of noise frames, wherein a number of the sequence of noise frames corresponds to the number of frames to be added.

18. The system of claim 15, wherein the processing device performs further operations comprising:
   determining motion information using the first plurality of frames, wherein the motion information represents a per-pixel motion between at least a pair of frames of the first plurality of frames.

19. The system of claim 18, wherein generating the second plurality of frames of the video further comprises operations comprising:
   receiving, by the video generation model, the first plurality of frames and an encoded representation of the motion information.

20. The system of claim 15, wherein the video generation model is a multitask model comprising one or more temporal layers configured to perform a text-to-video task, an image-to-video task, an inpainting task, an outpainting task, a motion brush task, and a video extension task, and wherein a task of the multitask model is selected using a mode indicator input received from the graphical user interface.

\* \* \* \* \*